(12) United States Patent
Gonzalez

(10) Patent No.: US 11,206,944 B2
(45) Date of Patent: Dec. 28, 2021

(54) SELF CHARGING MUG

(71) Applicant: Gustavo Gonzalez, Royal Oak, MI (US)

(72) Inventor: Gustavo Gonzalez, Royal Oak, MI (US)

(*) Notice: Subject to any disclaimer, the term of this patent is extended or adjusted under 35 U.S.C. 154(b) by 0 days.

(21) Appl. No.: 16/798,547

(22) Filed: Feb. 24, 2020

(65) Prior Publication Data

US 2021/0259459 A1  Aug. 26, 2021

(51) Int. Cl.
| | |
|---|---|
| *H02J 7/00* | (2006.01) |
| *H01M 10/613* | (2014.01) |
| *A47J 36/24* | (2006.01) |
| *H05B 1/02* | (2006.01) |
| *A47G 19/12* | (2006.01) |
| *H01M 10/42* | (2006.01) |

(52) U.S. Cl.
CPC ........ *A47J 36/2466* (2013.01); *A47G 19/127* (2013.01); *H01M 10/613* (2015.04); *H02J 7/007* (2013.01); *H02J 7/0042* (2013.01); *H02J 7/0045* (2013.01); *H05B 1/0252* (2013.01); *H01M 2010/4271* (2013.01); *H02J 2207/20* (2020.01)

(58) Field of Classification Search
CPC .... A47J 36/2466; H02J 7/0042; H02J 7/0045; H02J 7/007; H02J 2207/20; H01M 10/613; H01M 2010/4271; H05B 1/0252; A47G 19/2288; A47G 2200/16; A47G 2200/18; A47G 2200/166; A47G 19/127
See application file for complete search history.

(56) References Cited

U.S. PATENT DOCUMENTS

| | | | | |
|---|---|---|---|---|
| 9,359,182 | B1 * | 6/2016 | Kwiatkowski | A47J 41/0094 |
| 2007/0108189 | A1 * | 5/2007 | Cheng | A47J 36/2466 |
| | | | | 219/543 |
| 2008/0036425 | A1 * | 2/2008 | Tashiro | H01M 10/615 |
| | | | | 320/154 |
| 2012/0171528 | A1 * | 7/2012 | Liu | H01M 10/613 |
| | | | | 429/62 |
| 2015/0245667 | A1 * | 9/2015 | Memari | A24F 40/50 |
| | | | | 131/329 |
| 2017/0063130 | A1 * | 3/2017 | Sultenfuss | H02J 7/042 |
| 2018/0333007 | A1 * | 11/2018 | Ganahl | A47J 31/005 |

* cited by examiner

*Primary Examiner* — John W Poos
*Assistant Examiner* — Alex W Lam
(74) *Attorney, Agent, or Firm* — Raggio & Dinnin, PC

(57) ABSTRACT

A self charging mug that is capable of charging or discharging an energy storage system thereof to charge a phone and heat or cool a liquid therein. The self charging mug includes an outer shell and an inner shell nested within the outer shell. The self charging mug also includes a thermal interface member in contact with the inner shell and a thermal electric plate engaged with the thermal interface member. The self charging mug further includes a component fixture assembly and an energy storage system arranged within the component fixture assembly. The self charging mug also includes a bidirectional power supply and a seal connector secured to the bidirectional power supply. The self charging mug also includes a battery management system in contact with the component fixture assembly and a charge and discharge controller arranged on a surface of the battery management system in order to control the charging and discharging of the battery according to the present invention.

19 Claims, 18 Drawing Sheets

Device User Interface:
The device will have three buttons:

One for Phone Charging
One for Heating the mug's liquid
One for Cooling the Mugs Liquid

SELF CHARGING MUG

BACKGROUND OF THE INVENTION

1. Field of the Invention

The present invention generally relates to a mug or cup, and more particularly relates to a self charging mug capable of charging a battery arranged thereon and heating or cooling a beverage arranged therein.

2. Description of Related Art

Beverage mugs and coffee mugs have been known for many years. Generally these prior art beverage mugs may be insulated, may have dual wall construction that allows for the user of the beverage mug to hold the mug without having condensation forming on the outside of the mug or having the heat of a heated beverage arranged therein passing through the mug and burning the hand of the user. Other prior art mugs for coffee and other beverages may be single walled, without the insulated properties of double walled mugs. These mugs of the prior art have been known to be made of numerous materials, such as ceramic, glass, metal, plastic, composite or any other known natural or man made material. Many recent prior art beverage mugs have also included elements for heating or cooling of the beverage while the beverage is within the mug. These prior art mugs may have a heating element that may heat the beverage to a predetermined temperature, a cooling element that may allow for the beverage to be cooled or for ice to remain within the beverage and not melt for many hours, thus keeping the beverage cool. Many different types of prior art beverage mugs, either with or without handles, have been made and used with many various shapes and with many various components to allow for either the heating of a beverage therein or the cooling of a beverage therein to satisfy the user of the mug. However, none of the prior art beverage mugs have been designed and are capable of being used to charge a cellular phone or other electronic device. Furthermore, none of the prior art beverage mugs are capable of heating a mugs liquid or cooling a mugs liquid to predetermined temperatures and in the same mug system using the heat or coldness of the liquid arranged within the mug to charge an energy storage system arranged directly within the mug.

Therefore, there is a need in the art for a self charging mug, which has a dual wall construction that is capable of having an energy storage system arranged onboard within the mug. There also is a need in the art for a self charging mug that is capable of either cooling a liquid or beverage arranged within the mug or heating a liquid or beverage within a mug to predetermined temperatures chosen by the user of the mug. Furthermore, there also is a need in the art for a self charging mug that is capable of charging a cell phone or other electronic device via the energy storage system arranged within an inner bore of the self charging mug. There also is a need in the art for a self charging mug that is capable of using the heat or cold from the beverage arranged within the mug to charge the energy storage system arranged within the self charging mug via a peltier device. There also is a need in the art for a low cost, easy to manufacture self charging mug that is capable of indicating battery life of an energy storage system arranged thereon.

SUMMARY OF THE INVENTION

One object of the present invention may be to provide an improved mug.

Another object of the present invention may be to provide a mug that is a self charging mug.

Yet a further object of the present invention may be to provide a self charging mug that is capable of heating the liquid arranged therein to a predetermined temperature.

Still another object of the present invention may be to provide a self charging mug that is capable of cooling a beverage arranged therein to a predetermined temperature.

Still another object of the present invention may be to provide a self charging mug that is capable of charging a cell phone battery or other electronic device via a sealed connector header arranged through an outer surface of the self charging mug and an internal energy storage system arranged within the self charging mug.

A further object of the present invention may be to provide a self charging mug that is capable of charging the onboard energy storage system via either the heat or cold of the liquid arranged within the self charging mug.

Still another object of the present invention may be to provide a self charging mug that is capable of charging the internal energy storage system via a USBc cable connected to a sealed connector header arranged through a side wall of the self charging mug.

Still another object of the present invention may be to provide a self charging mug that is low cost, easy to manufacture and easy to use.

According to the present invention, the foregoing and other objects and advantages are obtained by a novel self charging beverage mug. The self charging beverage mug generally comprises an outer shell and an inner shell nested within the outer shell. The self charging mug comprises a thermal interface member in contact with the inner shell and a thermal electric plate engaged with the thermal interface member. The self charging mug also comprises a component fixture assembly in contact with a bottom inner surface of the outer shell, wherein the thermal electric plate is arranged in a pocket of the component fixture assembly. The self charging mug also comprises an energy storage system arranged within the component fixture assembly and a bi-directional power supply in contact with the component fixture assembly on a side thereof. The self charging mug also comprises a sealed connector header secured to the bi-directional power supply and arranged in an orifice through a side wall of the outer shell of the self charging mug. The self charging mug also comprises a battery management system in contact with a component fixture assembly on another side thereof, wherein the battery management system is electrically connected to the energy storage system and to the thermal electric plate. The self charging mug also comprises a charge and discharge controller arranged on a surface of the battery management system. The self charging mug is capable of either heating or cooling a liquid arranged therein or charging a cell phone or other electronic device via the internal energy storage system arranged therein. Furthermore, the self charging mug is capable of charging the onboard energy storage system via either the heat or cold of the liquid arranged within the mug.

One advantage of the present invention may be that it provides for an improved beverage mug.

Another advantage of the present invention may be that it provides for a beverage mug that is a self charging mug.

Still a further advantage of the present invention may be that it provides for a self charging mug that is capable of cooling a liquid or beverage arranged within the mug.

Still another advantage of the present invention may be that it provides for a self charging mug that is capable of heating a beverage or liquid arranged within the self charging mug via an energy storage system arranged therein.

Yet another advantage of the present invention may be that the self charging mug is capable of charging a cell phone or other electronic device via a sealed connector header arranged through a side wall of the self charging mug and with energy directly from the energy storage system arranged therein.

Still another advantage of the present invention may be that it provides a self charging mug that is capable of charging its own energy storage system via either the heat or cold of a liquid that is arranged within the self charging mug.

Yet another advantage of the present invention may be that it provides a self charging mug that is capable of being charged via an USBc function and cable thus allowing for quick charging of the energy storage system via a wired connection.

Still another advantage of the present invention may be that it provides a self charging mug that is easy to manufacture, easy to use and low in cost.

Other objects, features and advantages of the present invention may become apparent from the subsequent description and appended claims, taken in conjunction with the accompanying drawings.

BRIEF DESCRIPTION OF THE EMBODIMENT(S)

Figure 1:
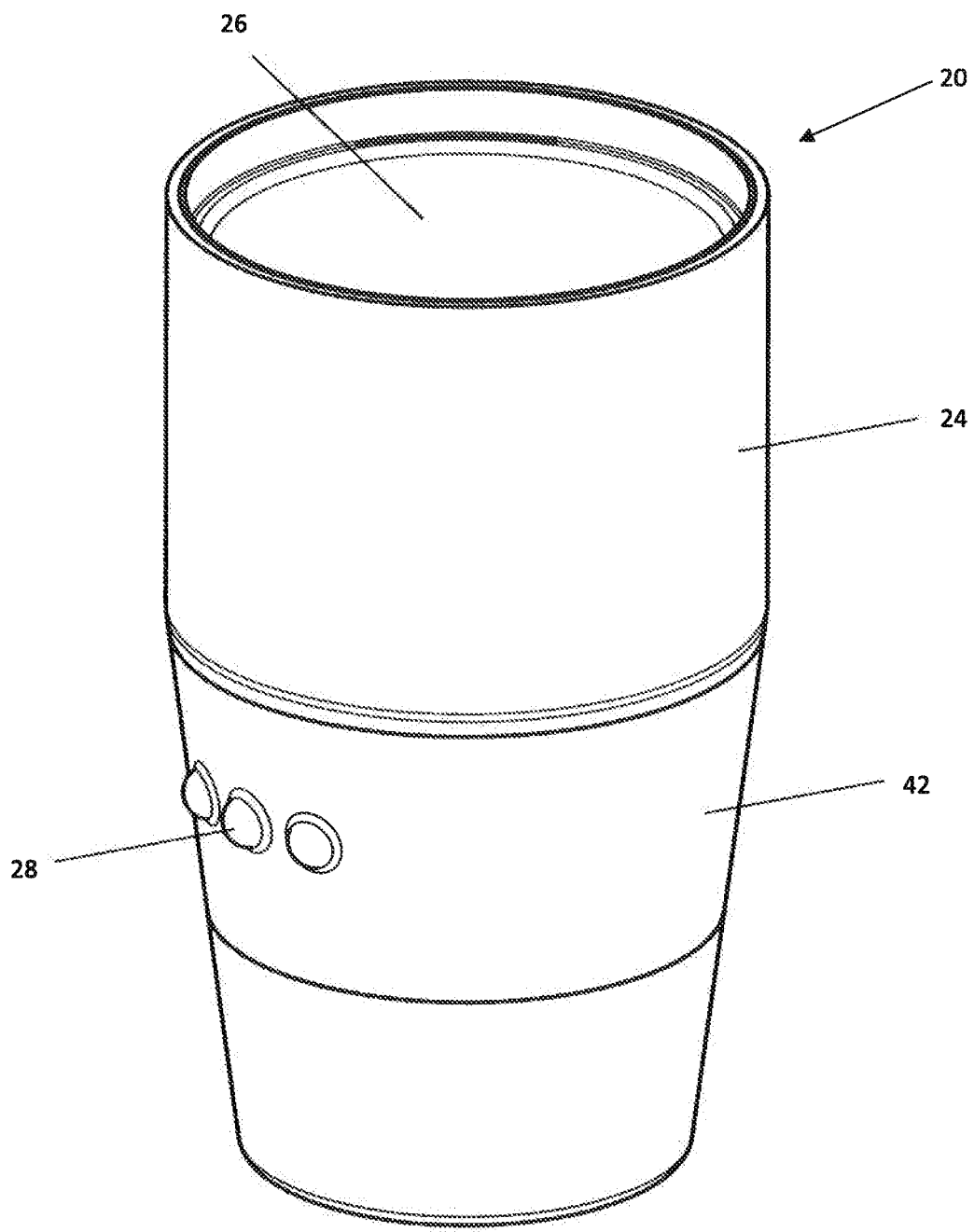
FIG. 1 shows a plan view of a self charging mug according to the present invention.
Figure 2:
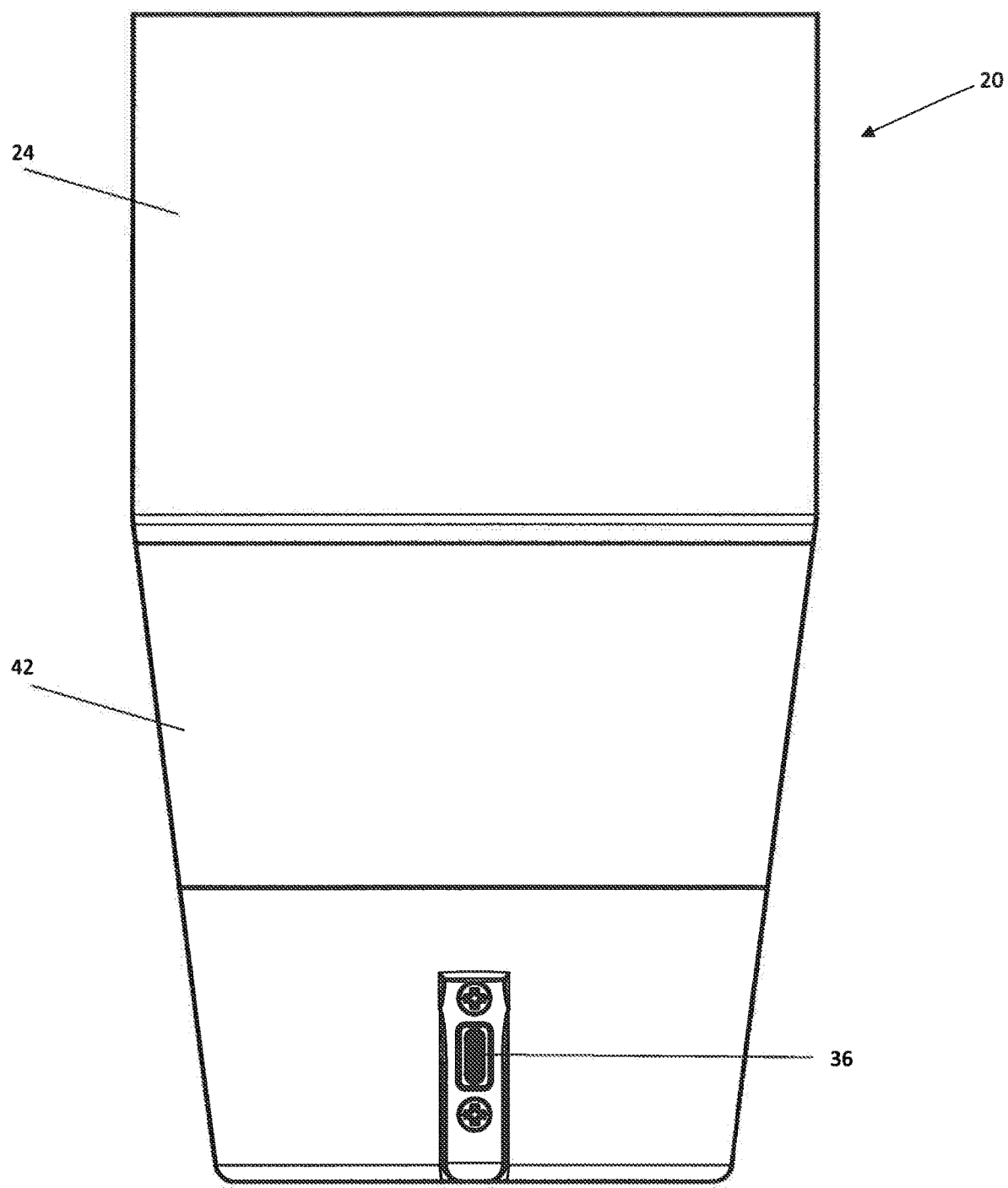
FIG. 2 shows a side view of a self charging mug according to the present invention.
Figure 3:
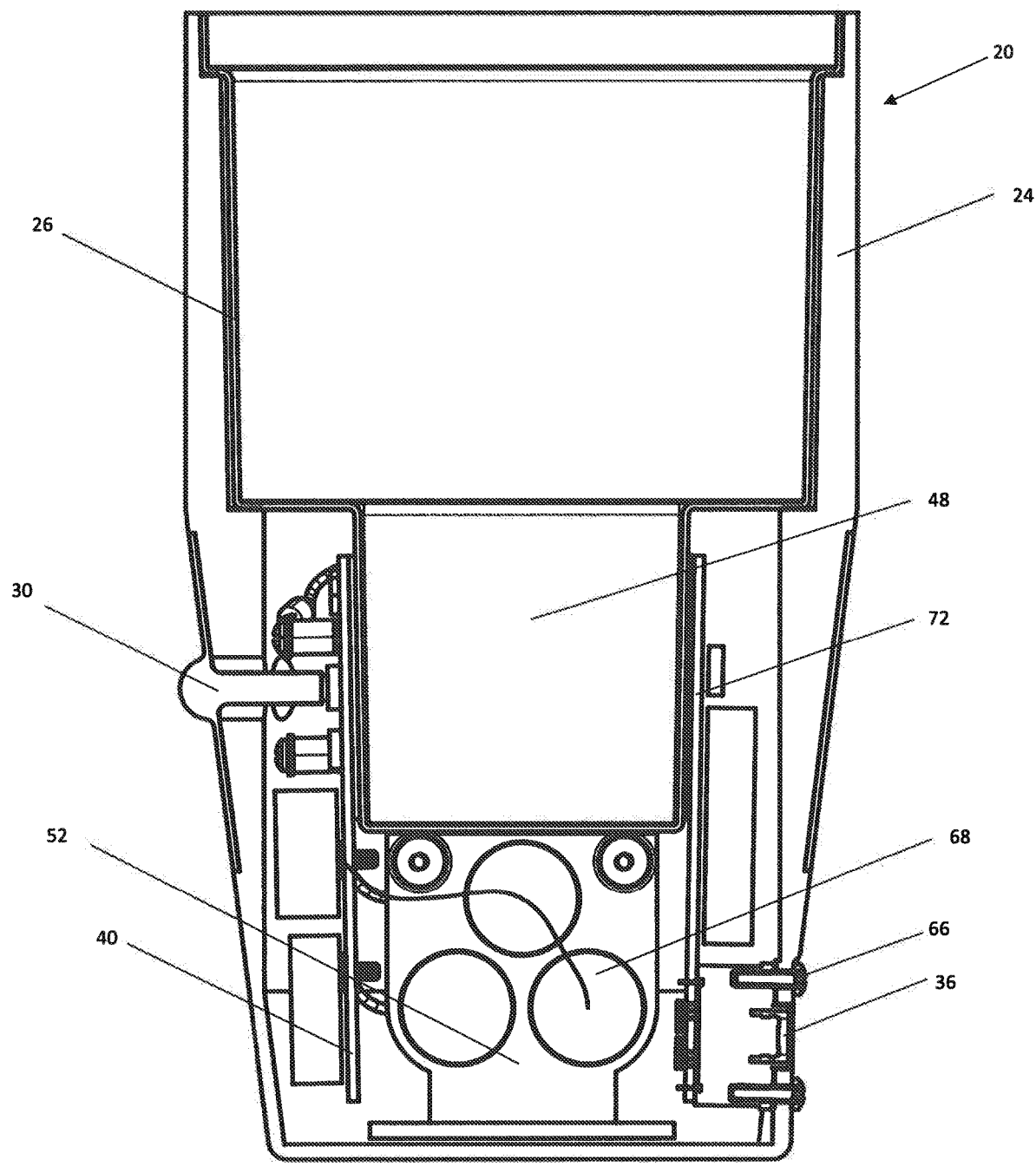
FIG. 3 shows a partial cross sectional view of a self charging mug according to the present invention.
Figure 4:
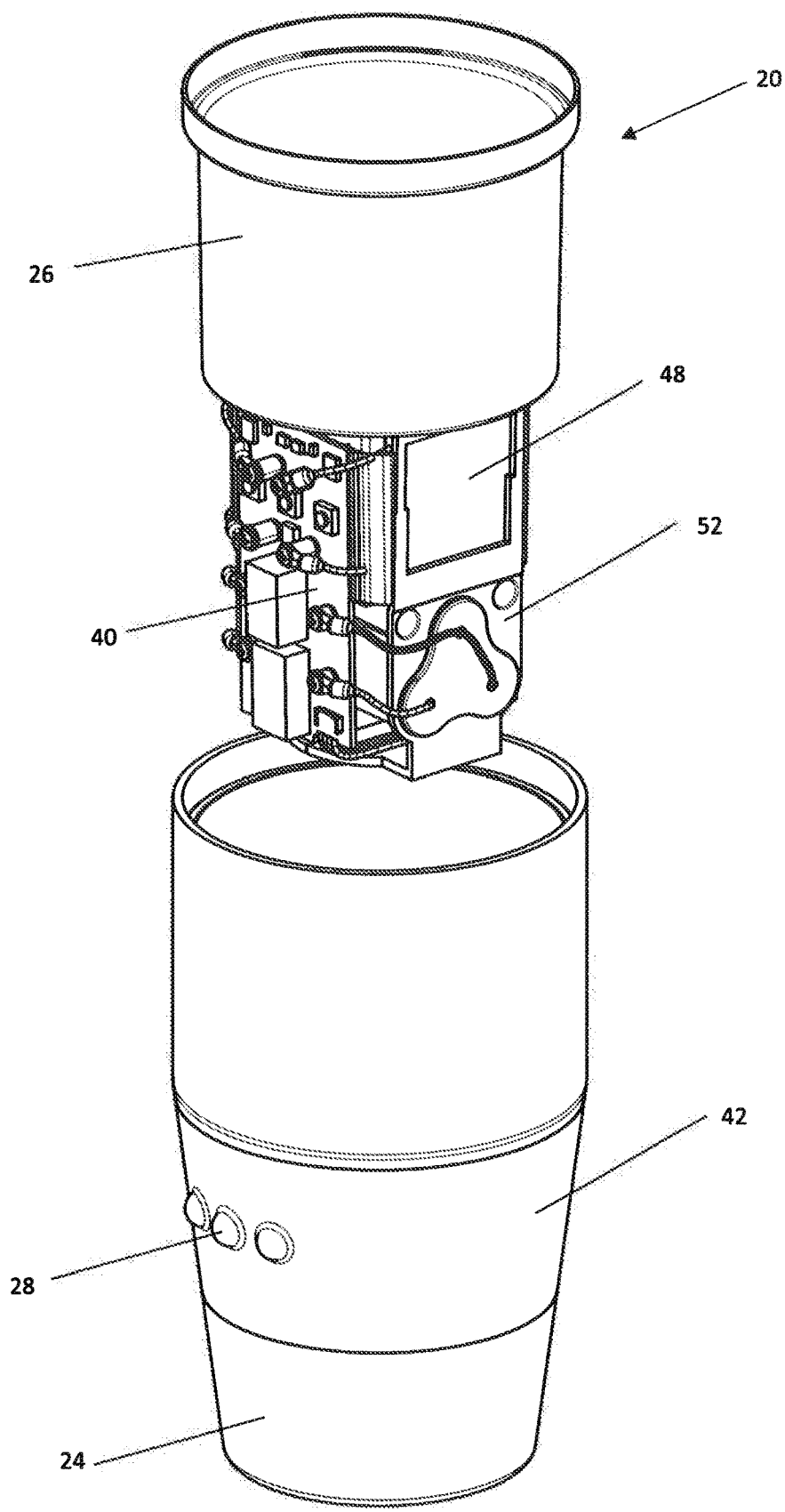
FIG. 4 shows a partially exploded view of a self charging mug according to the present invention.
Figure 5:
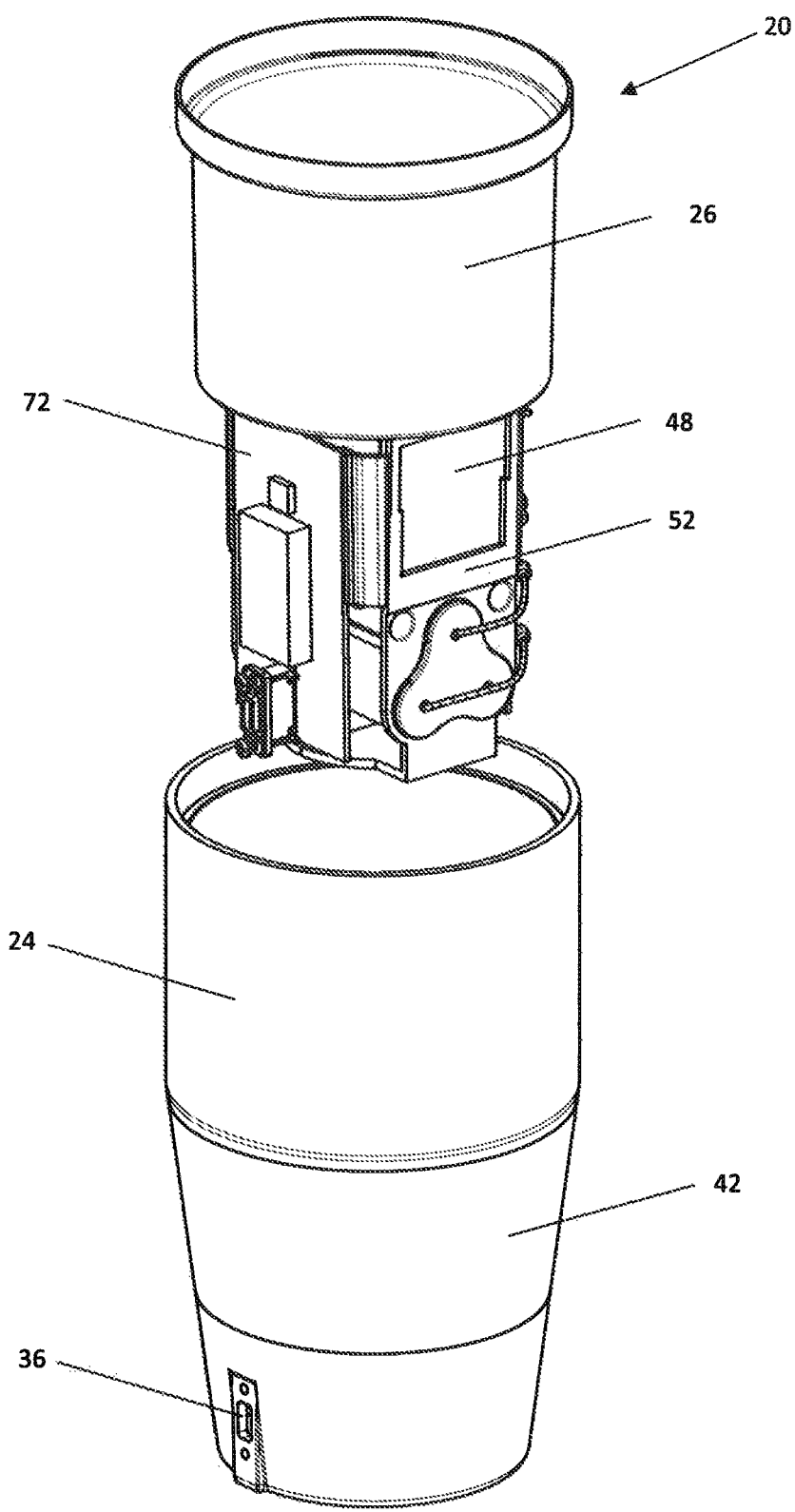
FIG. 5 shows a partially exploded view of a self charging mug according to the present invention.
Figure 6:
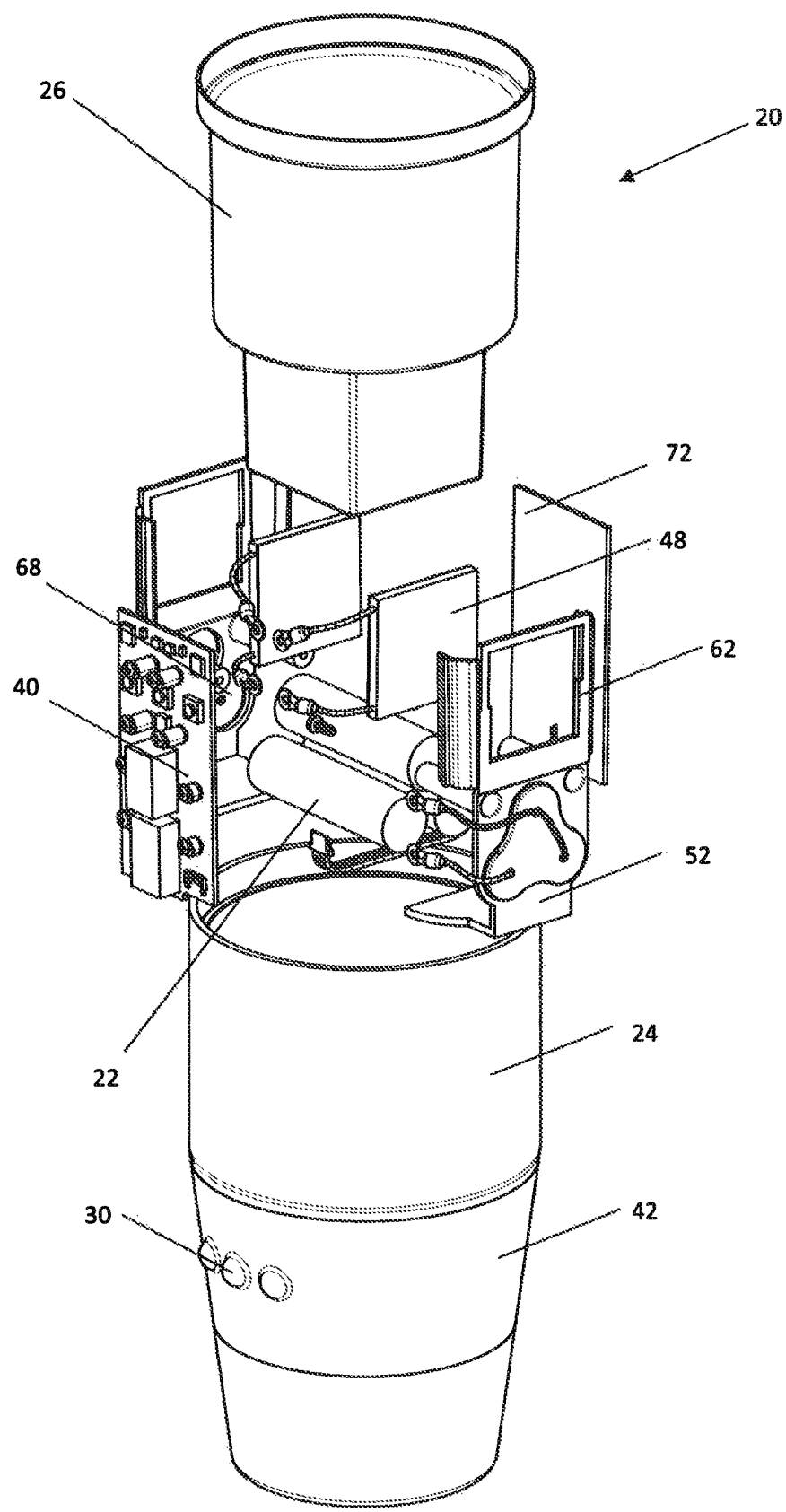
FIG. 6 shows an exploded view of a self charging mug according to the present invention.
Figure 7:
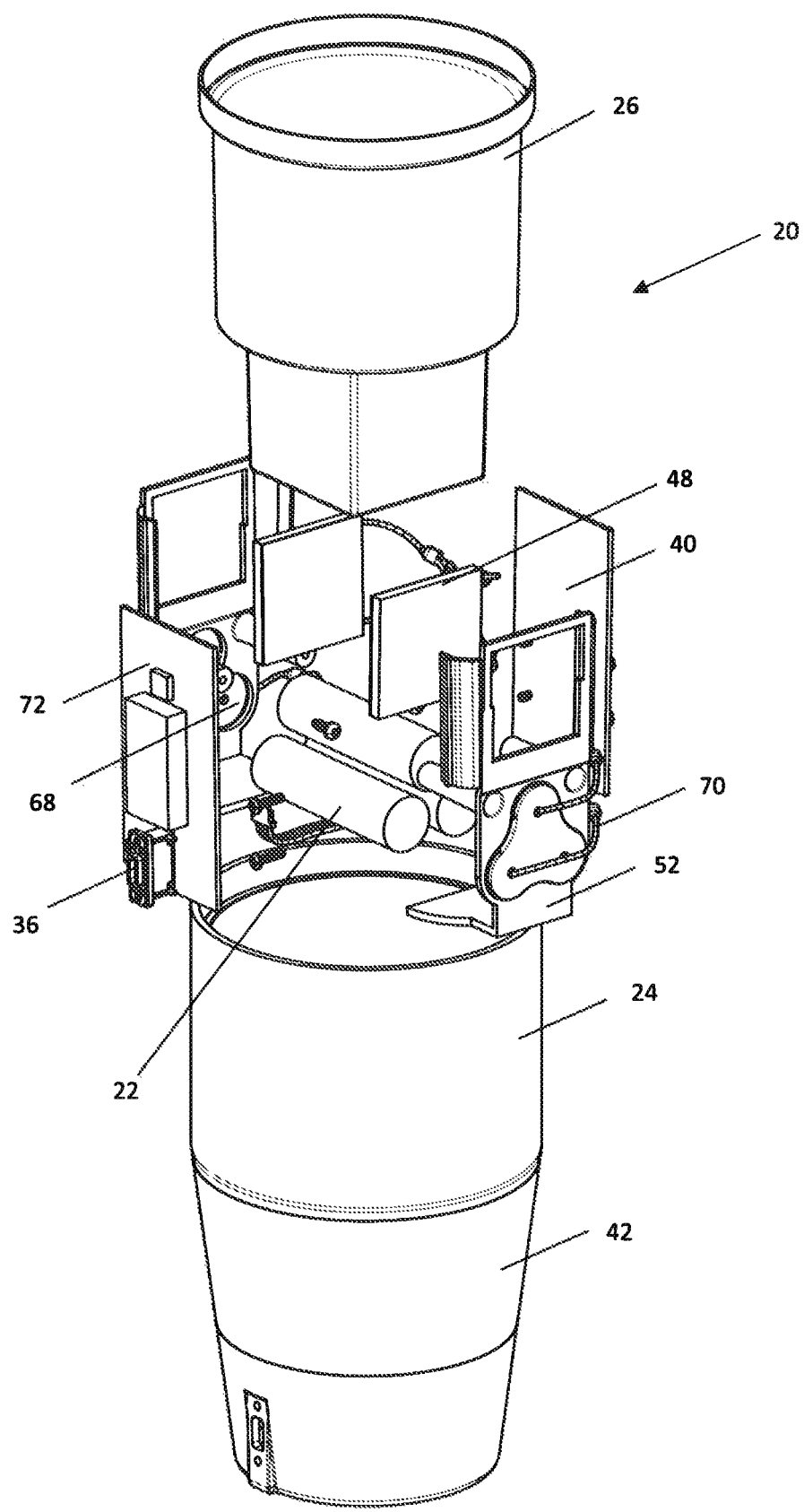
FIG. 7 shows an exploded view of a self charging mug according to the present invention.
Figure 8:
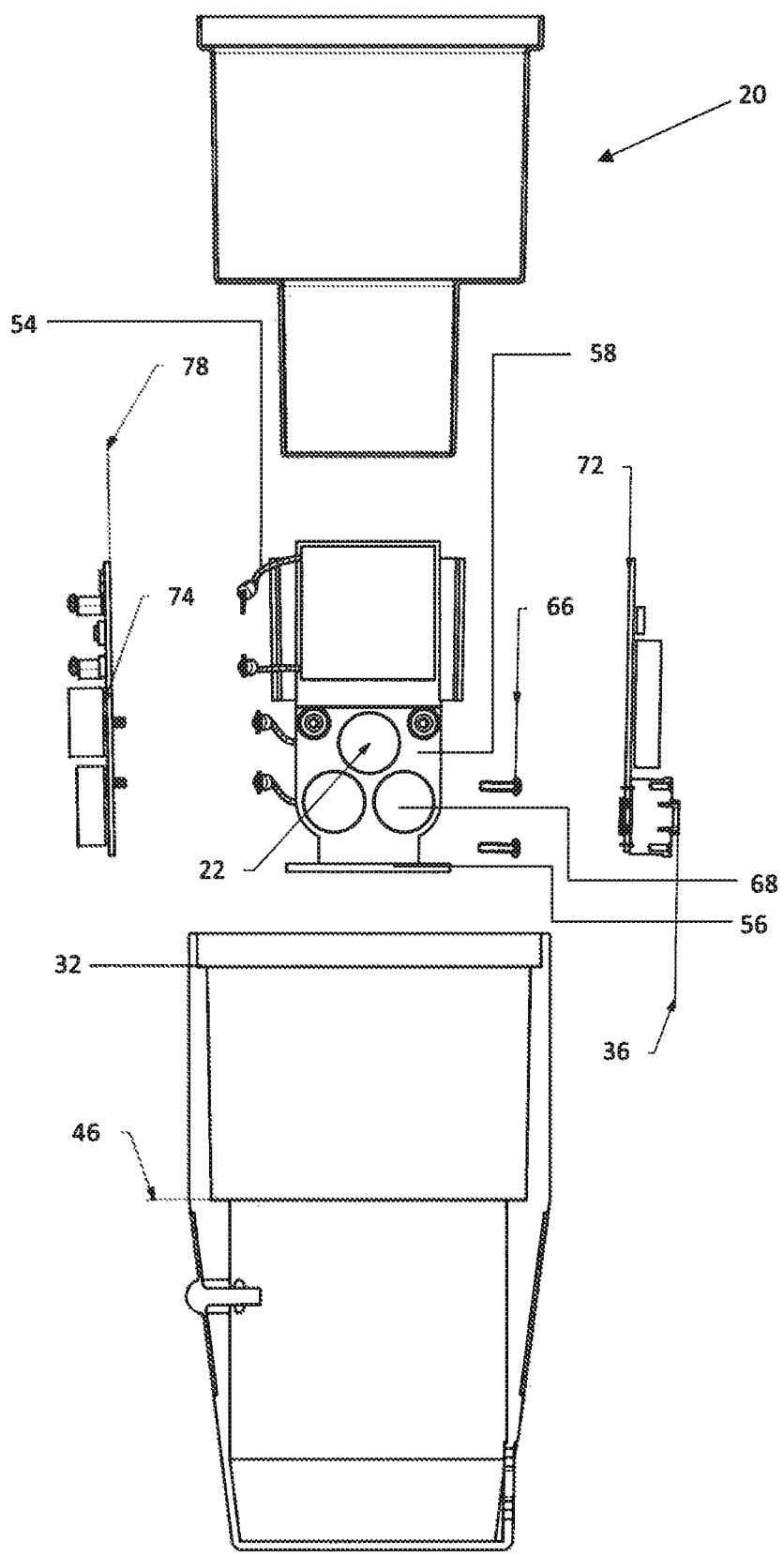
FIG. 8 shows an exploded view and partial cross section of a self charging mug according to the present invention.
Figure 9:
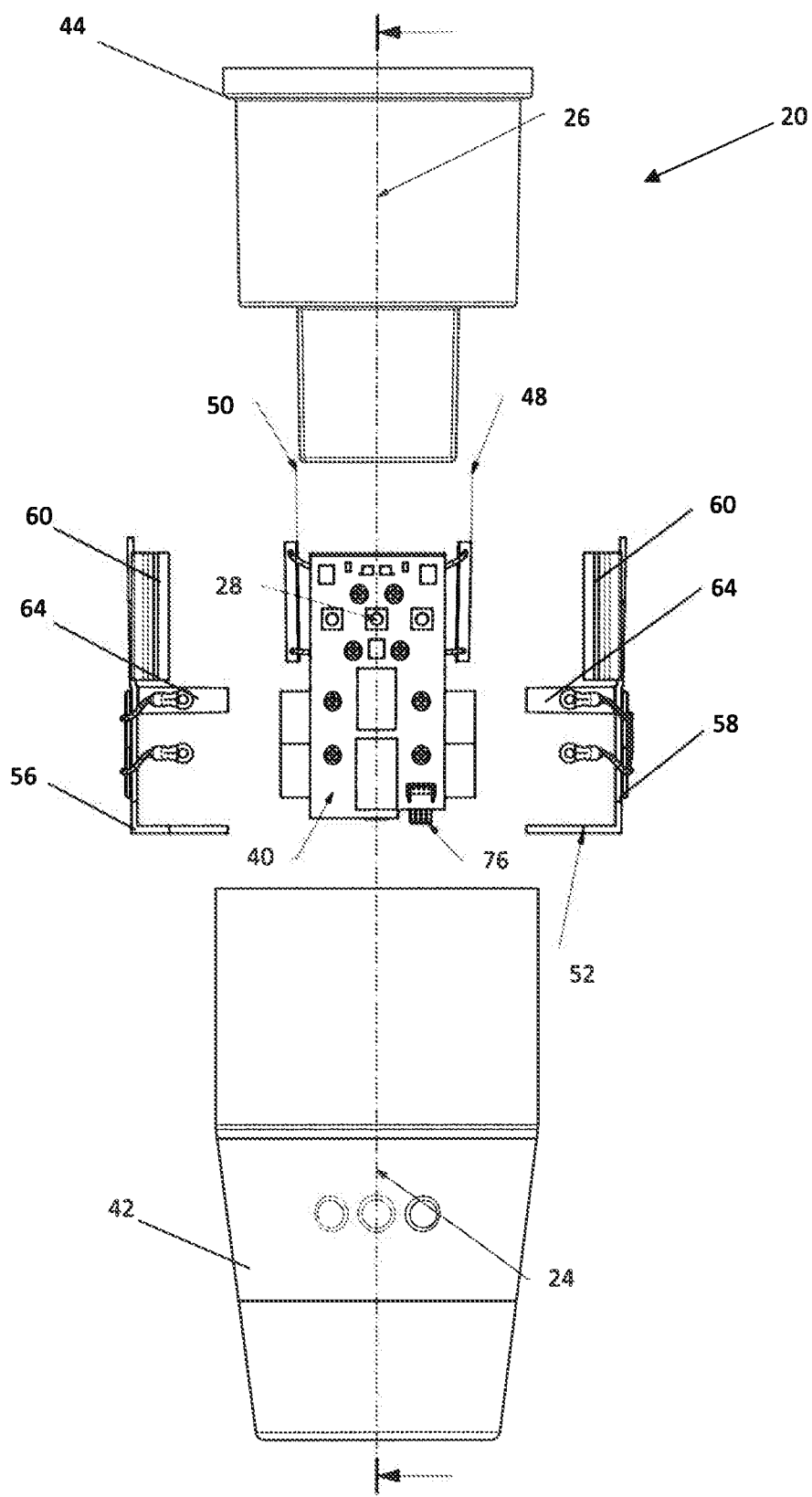
FIG. 9 shows an exploded view of a self charging mug according to the present invention.
Figure 10:
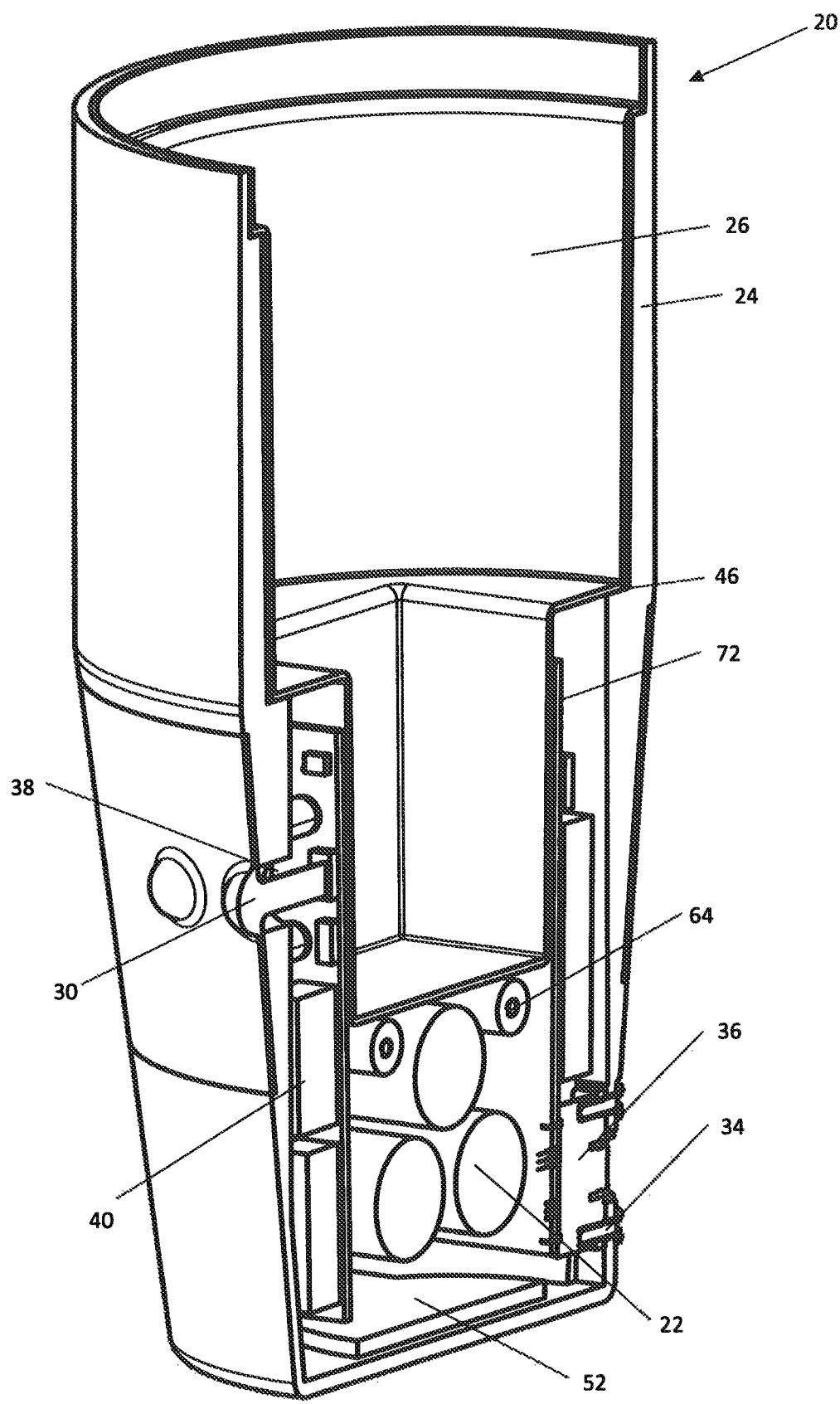
FIG. 10 shows a cross sectional view of a self charging mug according to the present invention.
Figure 11:
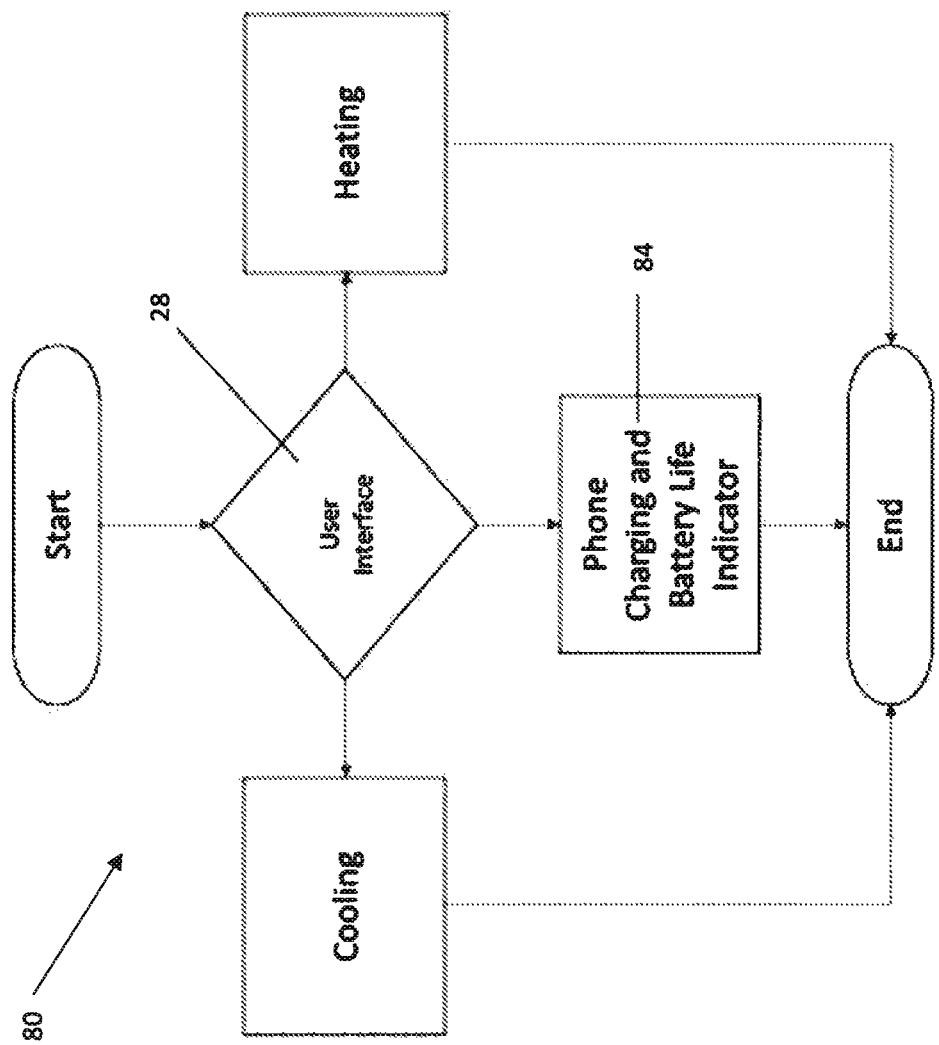
FIG. 11 shows a flow chart of a self charging mug according to the present invention.
Figure 12:
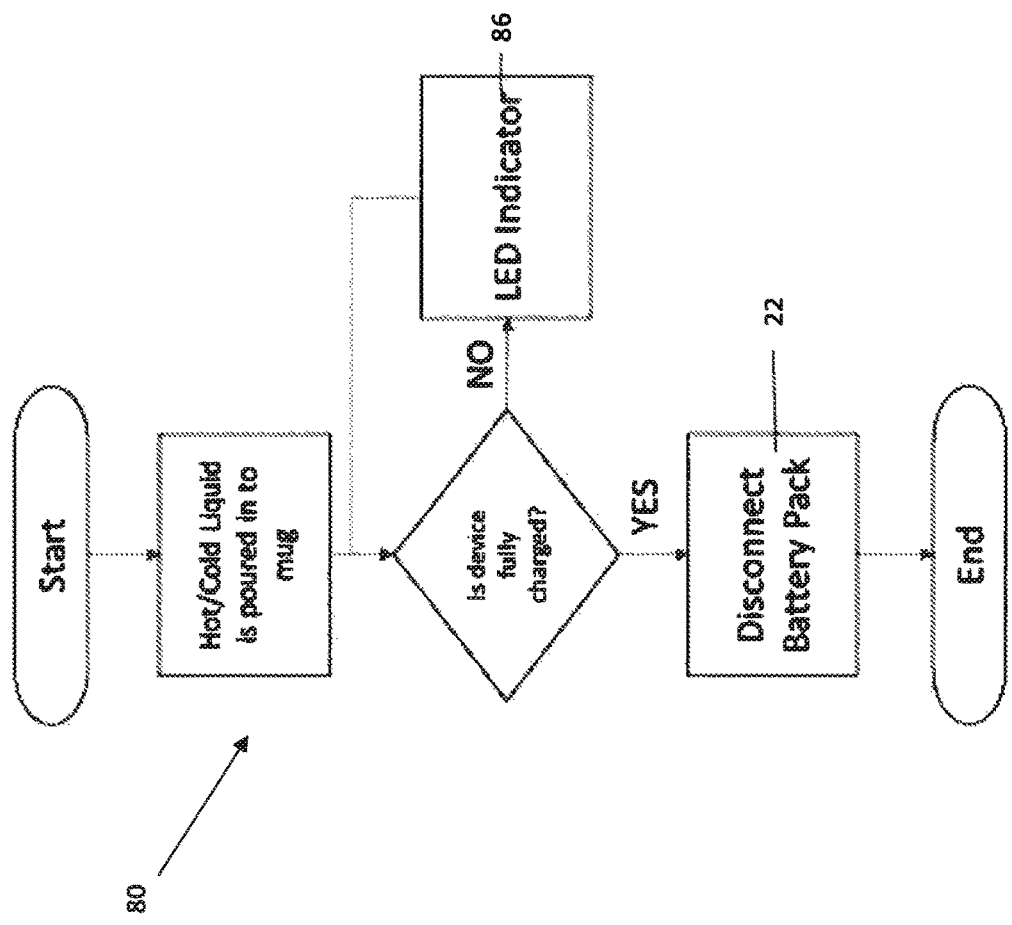
FIG. 12 shows a flow chart of a self charging mug according to the present invention.
Figure 13:
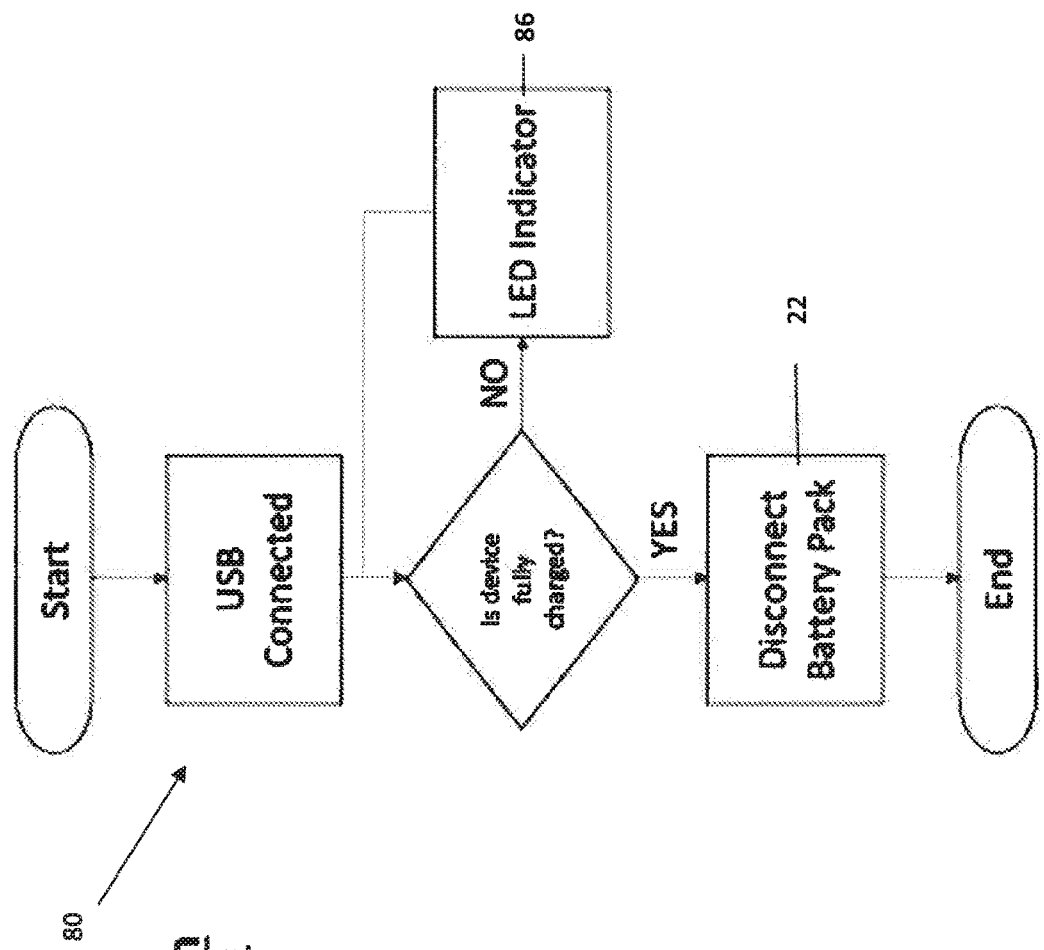
FIG. 13 shows a flow chart of a self charging mug according to the present invention.
Figure 14:
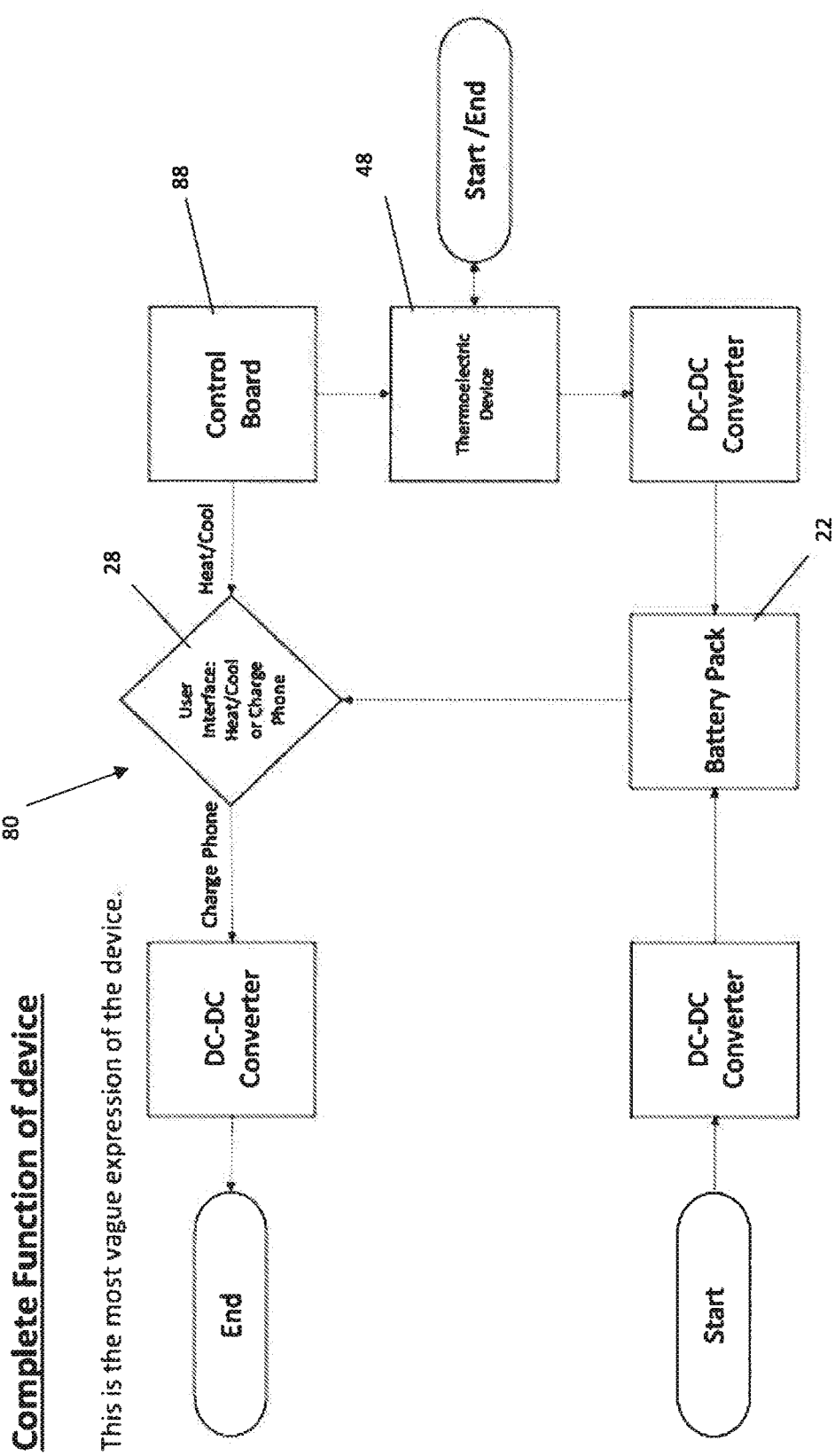
FIG. 14 shows a flow chart of a self charging mug according to the present invention.
Figure 15:
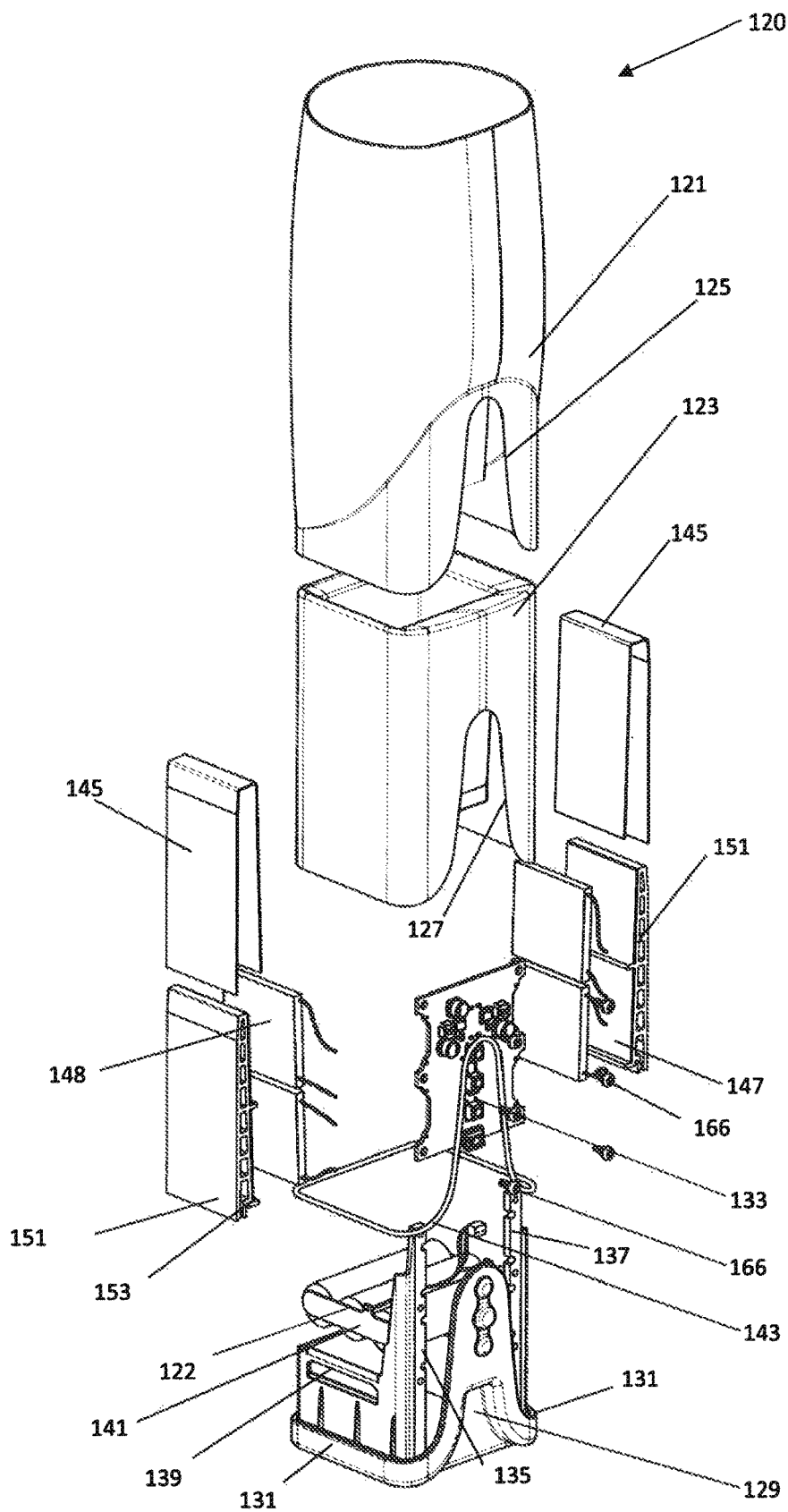
FIG. 15 shows an exploded view of an alternate embodiment of a self charging mug according to the present invention.

Referring to the drawings, there is shown a self charging mug 20 according to an embodiment of the present invention. The self charging mug 20 is a beverage mug that is capable of either heating or cooling a beverage arranged within the mug 20. Furthermore, the self charging mug 20 may be capable of charging a cell phone via an internal energy storage system 22 of the self charging mug 20. Also, the self charging mug 20 may be capable of charging the energy storage system 22 arranged within the self charging mug 20 via the heat or cold of the beverage arranged within the self charging mug 20. The self charging mug 20 in the embodiment shown is a mug 20 that generally has a cup like shape, but it is also contemplated that a handle may be attached to an outer surface of the self charging mug 20 to create a different use and aesthetic view for the user of the self charging mug 20. It should be noted that the self charging mug 20 may be made of any known material, either manmade or natural. In one contemplated embodiment, a metal material, such as steel, aluminum, etc., may be used to create al components of the self charging mug 20, such as the outer shell, inner shell 26, etc. However, it should be noted that any other known material, such as but not limited to any other metal, ceramic, composite, plastic, manmade material or natural material may also be used to form the self charging mug 20 according to the present invention. The self charging mug 20 may be of any known shape and size and is capable of being made to hold any size beverage from a few ounces up to many ounces depending on the use of the self charging mug and the environment in which it may be used. It is also contemplated that the self charging mug 20 may include a sealable lid arranged over a top opening thereof in order to either trap the heat or cold generated by the self charging mug 20 of the beverage or liquid arranged therein. It should be noted that it is contemplated to use any known beverage either a hot beverage or a cold beverage and/or liquid within the self charging mug 20 of the present invention. Furthermore, it is also contemplated that solids, such as food stuff or other materials may also be stored within the self charging mug 20 according to the present invention. Therefore, the self charging mug 20 of the present invention is a mug that may use the heat or cold of a liquid arranged therein to charge an onboard energy storage system 22 which generally is in the form of lithium ion batteries. Furthermore, the onboard energy storage system 22 may be used to heat or cool the beverage that is already placed within the inner shell 26 of the self charging mug 20 according to the present invention. The self charging mug 20 may have a user interface 28 that extends through an outer surface of the self charging mug 20 generally in the form of buttons 30 that may be used to select various temperatures or other functions. The self charging mug 20 as shown in the figures generally has a cup like cylindrical shape with a first or wider diameter top and a second or smaller diameter bottom end. It should be noted that any other shape, including but not limited to a square shape, triangular shape or other random shapes may also be used for the overall shape of the self charging mug 20 according to the present invention.

The self charging mug 20 may include an outer shell 24 having a generally cup like shape. The outer shell 24 may have a predetermined outer diameter and inner diameter with the top end having a larger diameter than the bottom end of the outer shell 24. Generally, at approximately a mid point or just before a mid point of the height of the self charging mug 20 the diameter may begin to reduce or taper down to the second smaller diameter at the bottom end of the self charging mug 20. The self charging mug outer shell 24 generally may be made of a metal material, however any other type of material as described above may also be used. It should further be noted that any known shape may be used for the outer shell 24 of the self charging mug 20 according to the present invention. Furthermore, any known dimensions, such as any known diameters, heights or thickness of the outer shell 24 may be used depending on the design requirements. It should further be noted that the outer shell 24 at the top end thereof may include a circumferential lip 32 arranged a predetermined distance below the top edge around the entire inner circumference of the outer shell 24. This circumferential lip 32 may be used to engage with an inner shell 26 and position the inner shell 26 in a predetermined position with relation to the outer shell 24, such that the inner shell 26 may nest within the outer shell 24 in a predetermined position. The outer shell 24 may also include a predetermined shaped orifice 34 arranged at a bottom edge thereof through a side wall. This orifice 34 generally may have any shape, but in the embodiment shown, a rectangular shape is used wherein a sealed connector header 36 may be arranged through this orifice 34 through the wall of the outer shell 24 in order to allow for a USBc cable to connect therewith. It should be noted that the sealed connector header 36 may generally repel liquids, sand, or other debris or dirt from infiltrating therein so as to protect and not affect the electrical connection between the sealed connector header 36 and the electronic systems arranged within the self charging mug 20. Furthermore, it may allow for the use of the self charging mug 20 in any known environment, such as water environments, beach environments, picnic environments, where sand, dirt or water may infiltrate into electrical connections or components thus allowing for the self charging mug 20 to be used in various places and environments. As shown in the figures, the outer shell 24 also may have a flat bottom, which is capable of being arranged on any flat surface and/or stored within any known cup holder. It should be noted that the sealed connector header 36 is generally arranged in the back of the self charging mug 20. Arranged on the opposite side or the front of the self charging mug 20 may be a user interface 28. In one contemplated embodiment, the user interface 28 may comprise a plurality of buttons 30 arranged through orifices 38 arranged through a wall of the self charging mug 20. In one contemplated embodiment as shown in the drawings, three circular orifices 38 may be arranged through the wall of the outer shell 24 and three buttons 30 may be placed through those orifices 38 such that the outer surface of the button 30 extends from the outer wall surface of the self charging mug 20 and an internal portion of the button 30 may interact with a battery management system 40 of the self charging mug 20. In one contemplated embodiment, the buttons 30 may be sealed buttons that will not allow for dirt, dust, water or other elements to infiltrate into the inner parts of the self charging mug 20. The buttons 30 may be capable of being pushed to choose a predetermined setting or function for the self charging mug 20. It should also be noted that it is contemplated to use LED's in association with the buttons 30 that may allow the buttons 30 to be lit in a predetermined color to help the user of the self charging mug 20 know the status and state of the self charging mug 20. These states may be self charging of the internal energy storage system 22, heating or cooling of a beverage arranged within the self charging mug 20, the charging of an external electronic device, such as a cell phone, is occurring or the status of the internal storage system batteries 22 of the self charging mug 20. It should be noted other information may be capable of being shown via different color lights, such as LED's arranged within the buttons 30 of the self charging mug 20. It should be noted that any other shaped button 30, other than circular and any other shaped orifice 38, may be arranged through the outer shell 24 depending on the design requirements of the self charging mug 20. These shapes may be anything from triangular, square, hexagonal, or any known shape or unknown shape or any random shape may be used for the buttons 30 of the self charging mug 20 according to the present invention. Furthermore, it is also contemplated that the outer shell 24 may have a grip 42 on an outer surface arranged at or near a mid point thereof. This grip 42 may be a rubber, plastic, neoprene or other material that is easy to grip and may allow for easy handling and use of the self charging mug 20 in all weather conditions and in all environments. In one contemplated embodiment, the grip 42 may generally have a ring like shape and may extend a predetermined distance around the outer periphery of the mug 20. It may have a predetermined length and diameter to match the outer shape of the outer shell 24 of the self charging mug 20. It is contemplated that the grip or handle portion 42 of the self charging mug 20 may be arranged within a channel or indentation arranged in the outer surface of the outer shell 24 or an interference fit or any other mechanical or chemical fastening technique may be used to secure the rubber or neoprene grip 42 to the outer surface of the outer shell 24 of the self charging mug 20. In one contemplated embodiment, the user interface 28 having the plurality of buttons 30 extending from an outer surface thereof may be arranged at a generally midpoint of the grip 42 of the self charging mug 20. The self charging mug grip 42 may extend a predetermined distance above and below the user interface 28 in a ring like shape. It should be noted that any other shape may be used for the grip 42 and that any type of contoured or specialized design may be arranged on the outer surface of the grip 42, thus providing a more secure feel to the user of the self charging mug 20.

The self charging mug 20 may also include an inner shell 26 that is arranged within the inner bore of the outer shell 24. Generally, the inner shell 26 may be nested within the outer shell 24 of the self charging mug 20. The inner shell 26 may have a flange 44 arranged at a top end thereof, wherein the flange 44 may have a shoulder surface that may interact with the inner lip 32 of the outer shell 24, such that the flange 44 may sit on the inner lip 32 of the outer shell 24 and position the inner shell 26 in a predetermined position with respect to the outer shell 24 such that the top edge of both the inner shell 26 and outer shell 24 may be at the same level such that the user of the mug 20 may see and feel a completely flushed top edge for the self charging mug 20. Generally, the inner shell 26 may have a cylindrical cup like shape for approximately the top one half thereof, wherein a bottom one half thereof or slightly less than that may have a cube or rectangular shape. The cube like shape arranged at the bottom half of the inner shell 26 may have a smaller length and width than the outer diameter of the inner shell top portion, which generally is a cylindrical or circular shape. It should be noted that any other shape may be used for the inner shell 26 depending on the design requirements and the internal electronic components arranged therein. The inner shell 26 generally is made of a metal material, such as that described above for the outer shell 24, however any other type of material may also be used. It should be noted that the inner shell 26 and the outer shell 24 may be formed via any known forging technique, or machining technique known in the art for metals, ceramics, composites, or plastics, etc. The inner shell 26 may extend a predetermined distance into the inner bore of the outer shell 24, such that there is a predetermined amount of space between the outside bottom surface of the inner shell 26 and the inner bottom surface of the outer shell 24. Arranged within this space or gap between those two surfaces may be the energy stored system 22 of the present invention. It should be noted that the four side walls that define the bottom cube like portion of the inner shell 26 may have any known dimensions, along with the bottom surface or wall that defines the bottom portion of the inner shell cube, may also have any known dimensions, depending on the design requirements of the self charging mug 20. It should further be noted that a cube is not the only shape capable of defining the bottom half of the inner shell 26, it may be a rectangular type shape or any other known shape, depending on the design requirements of the electronic components arranged therein. It should be noted that arranged between an inner surface of the outer shell 24 and an outer surface of the inner shell 26 may be a seal 46. This seal 46 may be used to create more efficient storage of the beverage or liquid arranged within the inner shell 26. It is contemplated that a full seal 46 that fills all space between the outer surface of the inner shell 26 and the inner surface of the outer shell 24 may be filled with the seal material, such as any known rubber, plastic, composite, or any other known seal material or a plurality of O-ring type seals may be arranged along various points between the inner shell 26 and outer shell 24 depending on the design requirements. It is also contemplated to just have one seal 46 arranged at a predetermined position of the outer shell 24 such as where the outer shell 24 starts to reduce its diameter towards the bottom surface of the outer shell 24. It should further be noted that generally the circumferential or cylindrical portion of the inner shell 26 extends to the point where the outer shell 24 may begin to taper its diameter down to the smaller diameter of the bottom portion of the outer shell 24. A single seal 46 may be placed at this portion of the self charging mug 20 or a seal may be placed within the entire gap arranged between the inner and outer shells 24,26 as described above.

A thermal electric plate 48 may be arranged within the outer shell 24 of the self charging mug 20 and in contact with or engaged with a thermal interface material 50. The thermal interface material 50 may allow for a more efficient transfer of the heat or cold between the liquid and the thermal electric plate 48. The thermal interface material 50 may in turn be in contact with and engage directly with one of the sides of the inner shell 26 on the bottom cube like portion thereof. It should further be noted that in another contemplated embodiment, a second thermal interface material 50 and second thermal electric plate 48 may be arranged on an opposite side of the inner shell 26 opposite that of the first thermal electric plate 48, such that a first and second thermal electric plate 48 are in contact with thermal interface material 50 which is in direct contact with an outer surface of the inner shell 26 of the self charging mug 20 according to the present invention. Generally, the thermal interface material 50 and thermal electric plate 48 have a square like shape, such that the thermal interface material 50 is engaged directly with an outer surface of the cube like portion of the inner shell 26 and the thermal electric plate 48 is engaged directly with the thermal interface material 50 on an inside surface thereof. The thermal electric plate 48 may be arranged within a pocket or portion of a component fixture assembly 52 on the outer surface thereof. The thermal electric plate 48 may have a plurality of wires 54 extending from a surface thereof, wherein the wires 54 are directly connected to a battery management system 40 of the self charging mug 20. It should be contemplated that in the embodiment shown a first and second wire 54 extends from the first thermal electric plate 48 and a first and second wire extend from the second thermal electric plate 48, wherein the thermal electric plates 48 are placed on opposite outside surfaces of the inner shell 26 of the self charging mug 20. The thermal electric plate 48 is generally defined as a peltier device, which typically operate on very low voltages when a temperature difference is applied thereto. In the present invention, the temperature difference may be the heat or cold of the beverage or liquid arranged within the inner shell 26 of the self charging mug 20, wherein that temperature difference may pass through the thickness of the inner shell 26 into the thermal interface material 50 and then into one side of the thermal electric plate 48. While using such peltier devices there may be the need for a DC to DC converter in order to boost the voltage from the peltier device, which generally is very low, to a voltage that is capable of charging the energy stored system battery pack 22 arranged within the self charging mug 20. Therefore, the thermal electric plate 48 may use the temperature difference that is created by either the heat or cold of the liquid in the mug 20 along with the opposite cold or hot temperature on the other side of the thermal electric plate 48, thus creating the low voltage that a peltier device creates via a temperature difference. This low voltage then uses the DC to DC converter to boost that voltage in order to charge the battery pack of the energy storage system 22 according to the present invention.

The self charging mug 20 also may include a component fixture assembly 52 arranged within the outer shell 24 of the self charging mug 20. The component fixture assembly 52 may be used to connect and hold the various internal components of the self charging mug 20 in a predetermined position. Generally, the self charging mug 20 of the component fixture assembly 52 may have a base 50 which has a generally circular portion surrounded by a square flange extending from each edge thereof and a first and second wall 58 extending from each side of the base 56. Generally, the base 56 as shown in the embodiment is a two piece base 56 that when put together creates the overall component fixture assembly 52 according to the present invention. It should be noted that the component fixture assembly 52 may be made of any known plastic, however any other known material such as any known metal, ceramic, composite, plastic, natural or manmade material may also be used. The first wall and second wall 58 of the component fixture assembly 52 may have a first and second flange 60 extending from an edge thereof. These first and second flanges 60 may extend and have a plurality of inner or outer extending portions and shoulders arranged therein, wherein the thermal electric plate 48 may be arranged between the first and second flange 58 on each side of the component fixture assembly 52 in order to secure the thermal electric device 48 in a predetermined position with respect to a side portion of the inner shell 26 of the self charging mug 20. It should be noted that a plurality of locking shoulders or locking fingers may be used to secure the thermal electric plate 48 in its predetermined position. Generally, a top portion of the first and second wall of the component fixture assembly 52 may have a predetermined shaped orifice 62 and in this case a generally square or rectangular orifice 62 is arranged therethrough, wherein a portion of the thermal electric plate 48 may be arranged adjacent to that orifice 62 but not extending therethrough in order to allow for the temperature difference necessary to allow for the device to create the voltage. The component fixture assembly 52 may also have extending from an inner surface thereof a first and second connector tube 64 extending from each wall 58 thereof at approximately a mid point thereof. These connector tubes may contact each other on the ends thereof and a predetermined type fastener 66 may be arranged into one end of the tube 64 and fastened to the other tube 64 to allow for a secure fastening between the first and second portion of the component fixture assembly 52 to create a complete component fixture assembly 52. It should be noted that the fastener 66 in one contemplated embodiment is a screw that is arranged through an inner bore of one of the connector tubes 64 and then the screw 66 is fastened to a surface of the second fastener tube 64 arranged on the opposite wall of the component fixture assembly 52. This may secure the two pieces of the component fixture assembly 52 to one another to create a solid one piece component fixture assembly 52. The component fixture assembly 52 may be arranged directly onto an inner bottom surface of the outer shell 34. It should be noted that a seal or other method of fastening the component fixture assembly 52 to the bottom surface of the outer shell 24 may be used, however it is also contemplated to have the component fixture assembly 52 rest directly on the outer shell 24 without any fastening or seal arranged therebetween. The wall 58 of the component fixture assembly 52 directly below the connector tubes 64 may have arranged a plurality of energy storage system cavities or holder members 68. In one contemplated embodiment as shown in the drawings, a plurality of generally circular orifices are arranged in a generally triangular shape to form a generally triangular outer indentation into the first and second wall of the component fixture assembly 52. Arranged between the first and second wall 58 of the component fixture assembly 52 may be the energy storage system 22. In one contemplated embodiment, such as that shown in the drawings, a plurality of batteries 22 are arranged and secured within the cavities of the first and second wall 58 of the component fixture assembly 52 such that the batteries 22 may be fixed in a predetermined position within the self charging mug 20. It should be noted that any type of battery may be used for the energy storage system 22, however it is contemplated to use lithium ion batteries in the present invention. Extending from the outside surface of the component fixture assembly 52 at the battery holder cavities 68 from an outside surface of the wall 58 of the component fixture assembly 52 are a first and second wire 70 extending from both sides thereof, wherein those first and second wires 70 are then connected to the battery management system 40 of the self charging mug 20. The component fixture assembly 52 may secure the thermal electric plate 48 and the energy storage system 22 in a predetermined position within the self charging mug 20 such that the energy storage system 22 is arranged in a gap between the bottom outer surface of the inner shell 26 and the bottom inner surface of the outer shell 24. It should further be noted that the first and second flanges 60 extending from a portion of the component fixture assembly 52 may also have connecting shoulders and fingers extending from an outer surface of those flanges 60, such that a battery management system 40 and a bidirectional power supply 72 may be secured and in contact with the component fixture assembly 52 to allow for the charging of the energy storage system 40 and heating and cooling of the liquid arranged therein. A plurality of fasteners 66 are used to secure the wires 70 extending from the energy storage system 22 and the thermal electric plate 48 to the battery management system 40 circuit board arranged therein. In one contemplated embodiment, the fasteners 66 are screws, however any other known fastener may also be used.

The self charging mug 20 also may include a battery management system 40 arranged within the outer shell 24 of the self charging mug 20. Generally, the battery management system 40 generally is in contact with a pair of first flanges 60 of the component fixture assembly 52 and is either secured via a locking shoulder or finger arranged on the component fixture assembly flanges 60 thereof and held in place via the locking mechanism. The battery management system 40 is aligned such that the user interface buttons 30 may interact with switches arranged on an outer surface of the circuit board of the battery management system 40. This circuit board may also include the LED's arranged thereon to allow for the buttons 30 to have a predetermined color depending on the status of the self charging mug 20. The battery management system 40 may also include a plurality of resistors, capacitors and diodes necessary to operate the electronic functions of the battery management system 40 including but not limited to the DC to DC converters, LED lights, temperature controls, settings to recharge the batteries, discharge the batteries, or to heat the liquid in the self charging mug 20. Some of these components may be arranged on the battery management system 40 circuit board or on the bidirectional power supply 72 which also includes a circuit board arranged on an opposite side of the inner shell 26 of the self charging mug 20. It is also contemplated that the inner surface of the battery management system 40 may contact the outer surface of one of the sides of the cube extension of the inner shell 24 or may have some sort of insulator 78, seal, gap or thermal protector arranged therebetween. The same is true for the bidirectional power supply 72 arranged on an opposite side of the inner shell cube extension from the battery management system 40. The thermal electric device 48 and the energy storage system 22 may have electrical connections secured to the battery management system 40 at various positions on the battery management system circuit board. It should be noted that the battery management system 40 also may include a charge and discharge controller 74 arranged thereon to allow for the charging or discharging of the energy storage system 22 in order to either charge the energy storage system 22, to heat or cool a liquid arranged within the self charging mug 20 or to charge an external electronic device such as a cell phone via the energy storage system 22 and the sealed connector header 36 arranged through a portion of the self charging mug 20. The electronics necessary to control the charge and discharge controller 74 may be arranged on the battery management system 40 circuit board.

The self charging mug 20 may also include a bidirectional power supply 72 arranged on a side wall opposite that of the battery management system 40 on the inner shell 24 of the self charging mug 20. The bidirectional power supply 72 may be able to convert AC voltage to DC voltage and then use a DC to DC converter to boost voltage which may be used to charge the battery pack 22 as described above. The use of the bidirectional power supply 72 may allow for charging of the internal energy storage system 22 via AC voltage passed through a USBc cable and then use that voltage after conversion to DC voltage to charge the lithium ion batteries of the energy storage system 22 or to use the low voltage produced from a thermal electric device 48, via the heat or cold of the liquid arranged within the inner shell 24 of the self charging mug 20, and then boosting that voltage via a DC to DC converter in order to charge the battery pack 22. Thus, the bidirectional power supply 72 allows for multiple uses of the self charging mug 20 according to the present invention. It should be noted that all necessary electronics and/or IC chips that are necessary to operate the bidirectional power supply 72 may be arranged on the bidirectional power supply 72 and the circuit board associated therewith. It should further be noted that the bidirectional power supply 72 is also connected and in contact with, via the second flanges 60 of the first and second wall 58, of the component fixture assembly 52 such that the bidirectional power supply 72 is held in a predetermined position with respect to the inner shell 26 and the outer shell 24 of the self charging mug 20. It should further be noted that the sealed connector header 36 is also connected via any known fastener 66 to a bottom portion of the bidirectional power supply 72. Thus, the sealed connector header 36 is electrically connected to the bidirectional power supply circuit board and at least two fasteners 66 are used to connect the sealed connector header 72 to the outer shell 24 of the self charging mug 20. In one contemplated embodiment, the fasteners 66 are screws such as those used for the fastening of the self charging mug 20 according to the present invention. The self charging mug 20 also may include an electrical harness 76 which is arranged between and electrically connects the battery management system 40 to the bidirectional power supply 72 thus allowing for power to transfer between the bidirectional power supply 72 and the battery management system 40, which controls the charging and discharging of the batteries, the heating and cooling of liquid arranged within the self charging mug 20, and the charging of external electric devices, which may allow for power to flow from the energy storage system 22 through the battery management system 40 and hence the electrical harness 76 to the bidirectional power supply 72 and then through the sealed connector header 36 to the cell phone or other electronic device being charged externally by the self charging mug 20.

Figure 16:
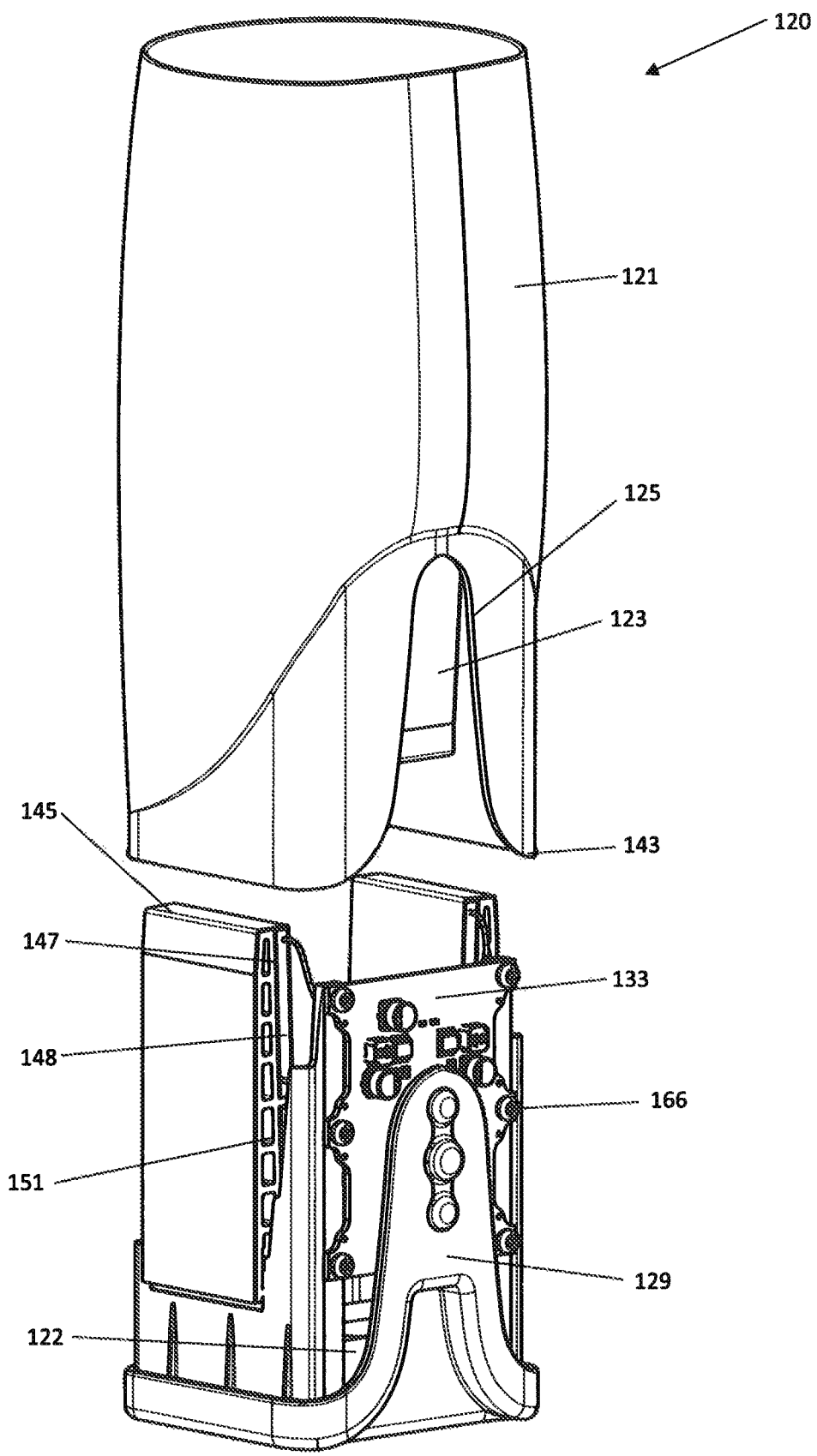
FIG. 16 shows a partially exploded view of the alternate embodiment of the self charging mug according to the present invention.
Figure 17:
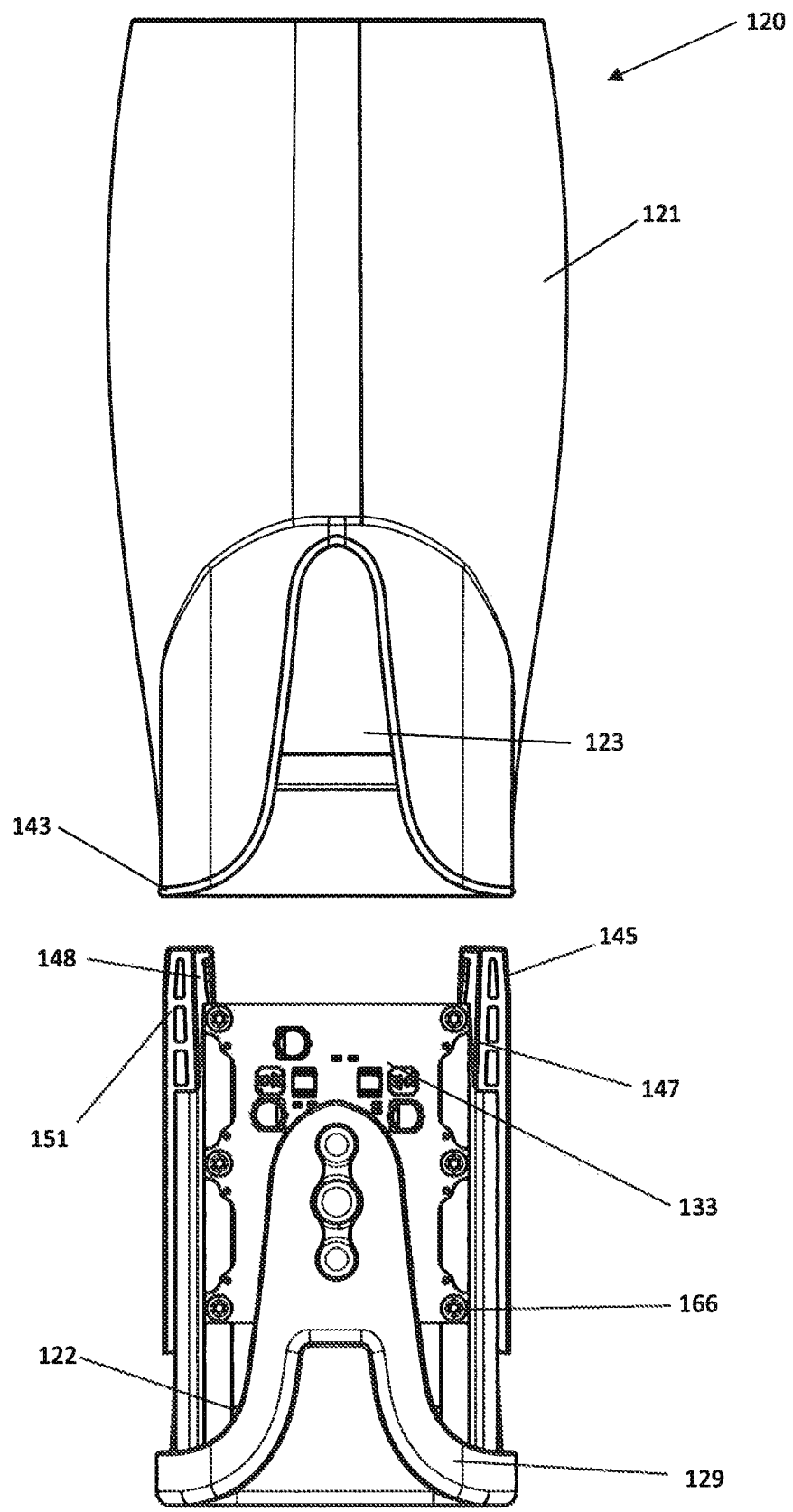
FIG. 17 shows a partially exploded view of the alternate embodiment of the self charging mug according to the present invention.
Figure 18:
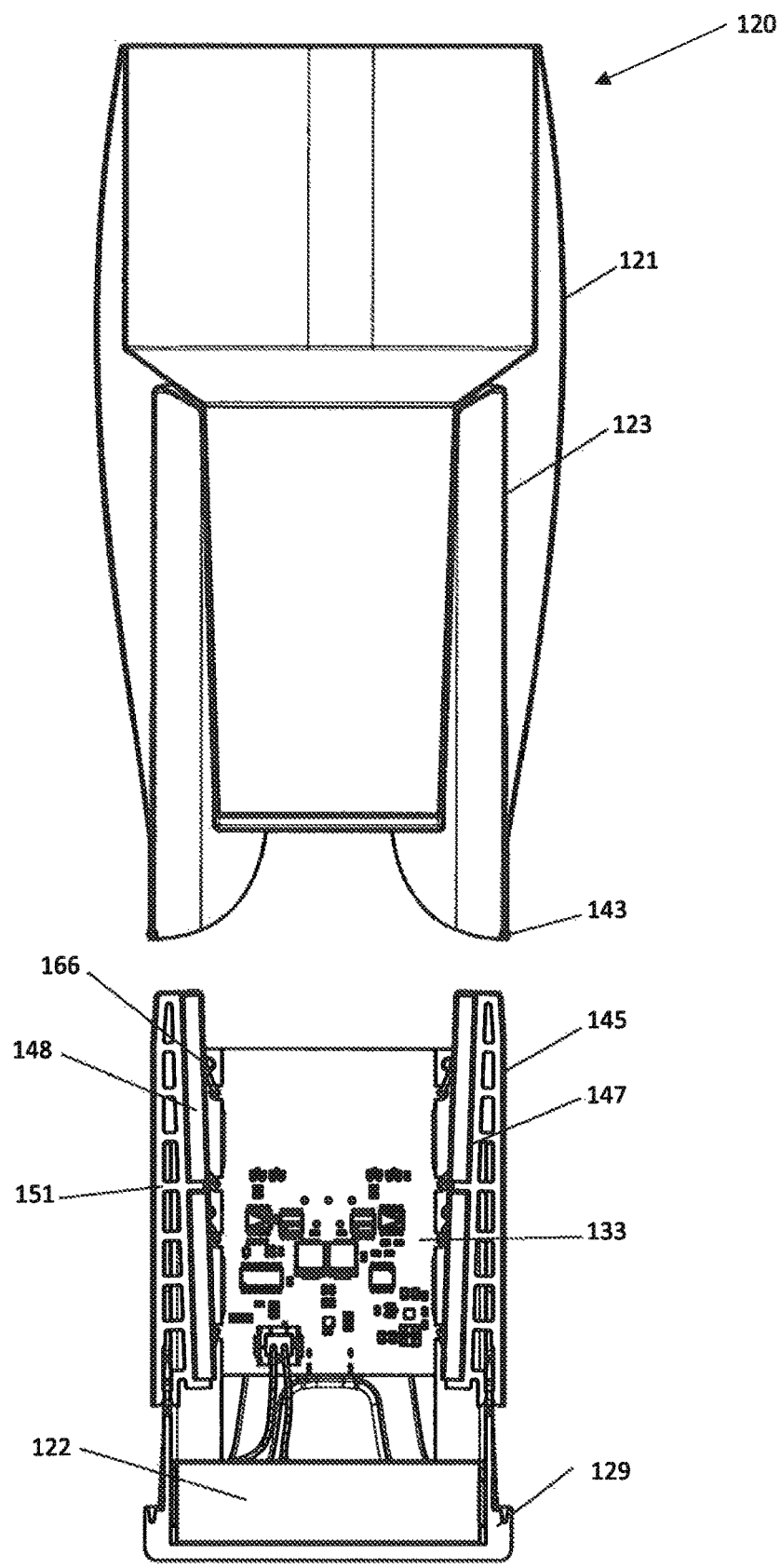
FIG. 18 shows a partially exploded view of the alternate embodiment of the self charging mug according to the present invention.

An alternate embodiment of the self charging mug 120 is shown in FIGS. 16 and 17. Like numerals indicate like parts. In this embodiment, the self charging mug 120 may include an outer shell 121 having any known shape and size. Furthermore, the outer shell 121 may include an inner bore having a cup like shape for holding a liquid therein. Generally, a bottom portion of the inner bore of the outer shell 121 may have a cube or rectangular/square shape. A bottom end of the outer shell 121 may be open and includes a predetermined shaped notch 125 arranged on a front face thereof. This notch 125 may have an elongated oval like shape. However, any other shaped notch 125 may be used. The outer shell 121 may have a predetermined size gap arranged between an outer wall of the outer shell 121 and an inner wall of the outer shell 121, wherein the inner wall of the outer shell 121 forms the inner bore, which is the receptacle used to hold a beverage or liquid therein. This gap may have any predetermined size and shape. The alternate embodiment of the self charging mug 120 may also include an inner shell 123, which is arranged within this gap of the outer shell 121. The inner shell 123 may be placed within the bottom opening of the outer shell 121 and nested around the rectangular bottom portion of the inner bore of the outer shell 121. The inner shell 123 may be nested and seated around the cube like bottom portion of the outer shell inner bore, such that it is in contact with all four sides of the cube like extension on an inner surface thereof. The inner shell 123 may have any known shape that may mimic the shape of the outer shell 121. Generally, the inner shall 1213 may also have a cup like shape with an inner bore that mimics the bottom portion of the inner bore of the outer shell 121 which is cube like or rectangular/square in shape. Hence, the inner shell 123 may interact with and interengage with an outer surface of the inner bore of the outer shell 121 within its own inner bore having the same general shape only slightly larger in order to nest or be seated with a tight tolerance to the outer shell 121. The inner shell 123 may also include a gap arranged between a surface of the inner bore of the inner shell 123 and an outer surface of the inner shell 123. Generally, the outer surface of the inner shell 123 may engage with an inner surface of the outer shell 121. It should also be noted that a notch 127 having the same or similar shape as the notch 125 of the outer shell 121 may be arranged within a front face of the inner shell 123. The inner shell 123 may be arranged within a bottom portion of the outer shell 121 and the notch 127 of the inner shell 123 and the notch 125 of the outer shell 121 may match and appear as a single notch after the inner and outer shells 121, 123 are nested or secured together. The alternate embodiment self charging mug 120 also may include a bottom housing member 129. The bottom housing 129 may have a generally square shaped base that includes outer walls 131 extending from the bottom housing 129. The bottom housing 129 also may include the front outer wall 131 generally having the same shape as the notch 125, 127 arranged within the inner shell 123 and outer shell 121, such that when the inner and outer shell 123, 121 after being secured to one another are arranged on the bottom housing 129 and in particular the front wall 131 of the bottom housing 129 may be arranged within the notch 125, 127 of the inner 123 and outer shell 121 thus forming a solid cup between the bottom housing 129 and the inner 123 and outer shell 121. The front wall 131 of the bottom housing 129 may also have a notch arranged therein, wherein a connector port may be arranged within that notch in order for a USBc cord to be plugged into the self charging mug 120 of the alternate embodiment. The sealed connector port may then be arranged on a control board 133 which is secured to a portion of the bottom housing 129. The bottom housing 129 may also include a first 135 and second connector arm 137 and a first and second locking shoulder member 139 arranged on opposite sides thereof. Furthermore, the bottom housing 129 may also include extending from the first and second connector arms 135, 137 energy storage assembly connecting fingers 141. These fingers 141 generally may be perpendicular to the connector arms 135, 137. Arranged within these connecting fingers 141 may be a plurality of lithium ion batteries or other batteries as described above which form the energy storage system 122 of the alternate embodiment of the self charging mug 120. The alternate embodiment of the self charging mug 120 may also include a control board 133 that is secured to the first and second connecting arms 135, 137 of the bottom housing 129. Any known fastener 166, such as screw as described above, may be used to secure the control board 133 to the bottom housing 129. It should be noted that the control board 133 may have any known shape or thickness. It should also be noted that the control board 133 generally may include the functions of the charge and discharge controller, bidirectional power supply and battery management system from the first embodiment described above. Hence, a sealed connector port may be secured directly to the control board 133 such that the control board 133 when secured to the bottom housing 129 may extend through an orifice into the notch of the front wall 131 of the bottom housing 129 allowing for a USB cable or other type of cable to be secured thereto and allow for the ability to charge the energy storage system 122 arranged in the self charging mug 120. The alternate embodiment of the self charging mug 120 may also include a seal or a weld 143 arranged around a top edge of the bottom housing 129. This seal 143 may interengage with the bottom edge of both the inner shell 123 and outer shell 121 and the notch 125, 127 arranged within the inner 123 and outer shell 121 to allow for a secure seal between the components of the self charging mug 120 according to the present invention. It should also be noted that a vacuum seal is also contemplated to be used to seal the inner shell 123, outer shell 121 and bottom housing 129 to one another. It should further be noted that it is also contemplated not to use any type of seal to connect the inner shell 123, outer shell 121 and bottom housing 129 in the alternate embodiment of the self charging mug 120, however it is also noted that any known chemical fastening technique or mechanical fastening technique may also be used to secure the inner shell 123 to the outer shell 121 and to the bottom housing 129 of the alternate embodiment of the self charging mug 120. The alternate embodiment of the self charging mug 120 also has the energy storage system 122 electrically connected to the control board 133 to allow for charging and discharging of the batteries 122, such as that described above for the first embodiment. The alternate embodiment of the self charging mug 120 may also include a plurality of thermal electric devices 148 and a first 145 and second thermal interface 147 engaged therewith. As shown in the drawings, a first and second thermal electric device 148 is arranged on a first and second side of the self charging mug 120 according to the embodiment. These first and second thermal electric devices 148 arranged on each side, create a total of four thermal electric devices 148 being arranged within the self charging mug 120. The thermal electric devices 148 are electrically connected to the control board 133. It should be noted that any number of thermal electric devices 148 may be used according to the alternate embodiment of the self charging mug 120, however in the embodiment shown a total of four are used. A first thermal interface member 145 is arranged over and in contact with one side of the thermal electric device 148 as shown in the drawings. The first thermal electric interface member 145 generally has a saddle like shape and is in contact with a first side of a first and second thermal electric device 148. This thermal interface 145 is also in direct contact with and engages with an outer surface of the inner bore of the inner shell 123 such that any liquid arranged within the self charging mug 120 may have its heat or cold pass through the inner bore of the outer shell 121 and inner shell 123 and into the first thermal interface 145 of the present invention. The self charging mug 120 of the alternate embodiment also includes a second thermal interface member 147 that is arranged on the opposite side of the thermal electric devices 148 as that of the first thermal interface member 145. This second thermal interface member 147 is also in contact with a heat sink member 151. A first and second heat sink member 151 may be used within the alternate embodiment of the self charging mug 120. The heat sink member 151 may be made of any known plastic, ceramic, composite, metal or any other natural or manmade material. The sink 151 generally may have a rectangular shape with a predetermined width and may mimic the shape of an inner gap of the first thermal interface 145 having a generally saddle like shape. The heat sink 151 generally may have a plurality of cavities arranged through a width thereof thus forming an air gap therebetween. An inner surface of the heat sink 151 also may include a first and second ledge 153, wherein the thermal electric devices 148 are arranged with a bottom portion touching or contacting either the first or second ledge 153, thus allowing the thermal electric devices 148 to be positioned in a predetermined manner with respect to the inner shell 123. It should further be noted that the heat sink 151 may also include a locking finger or tab mechanism arranged on a bottom surface thereof, which may interact with the locking surface 139 arranged on each side of the bottom housing 129, such that a snap fit locking arrangement may occur between the heat sink 151 on each side of the self charging mug 120 and the bottom housing 129. In one contemplated embodiment the locking surface of the bottom housing 129 may include a locking orifice, wherein a locking finger from the bottom of the heat sink 151 may be arranged therein and snap into place, thus securing the heat sink 151 to the bottom housing 129. Hence, with a first and second thermal electric device 148 arranged on an inner face or wall of the heat sink 151, the thermal interface member 145 may then be arranged over both the heat sink 151 and the first and second thermal electric device 148 such that the first thermal interface 145 may be used to secure and hold the heat sink 151 and thermal electric devices 148 along with the second thermal interface 147 to one another and against the outer wall of the inner bore of the inner shell 123 of the self charging mug 120. After the first thermal interface 145, having the heat sink 151 and thermal electric devices 148 arranged within its gap, is arranged within the gap formed between the outer wall and the inner bore of the inner shell 123 the first thermal interface 145 may be pressed fit within the gap, thus securing and holding the thermal electric devices 148 in a predetermined position with respect to the inner bore and allow for heat transfer therethrough from the beverage or liquid arranged within the self charging mug 120. As shown in the drawings, a first thermal interface 145 is arranged on one side of the self charging mug 120 and on the opposite side a second first thermal interface 145 is arranged therein as described above. In operation, the alternate embodiment of the self charging mug 120 operates in the same way as that described above for the original embodiment. Any of the parts of the alternate embodiment may be made of any known materials, such as those described above for the first embodiment. It should be noted that the self charging mug 120 may also have a communication microcontroller 153 arranged on the control board 133 or other surface of the mug. The communication microcontroller 153 may be capable of communicating with and controlling the mug 120 via a phone or other internet enabled device.

In operation, the self charging mug 20 is capable of being used in any location because of the sealed connector header 36, thus it is ideal for beaches, picnics, or any wet or dirty environment. As noted above, the self charging mug 20 may have a device user interface 28 wherein it may have any number of buttons 30 arranged therewith. In the contemplated embodiment shown in the drawings, the self charging mug 20 may have three buttons 30. One of the buttons 30 may be for phone charging, one of the buttons 30 may be for heating the liquid or beverage within the self charging mug 20 and one of the buttons 30 may be for cooling the liquid or beverage arranged within the self charging mug 20. Generally, the methodology 80 that controls the electronics of the self charging mug 20 may start and may enter a box and monitor the user interface 28 and may determine if the cooling button has been pressed or if the heating button has been pressed and if the cooling or heating buttons have been pressed, it may send the appropriate instructions to allow for cooling of the beverage via the thermal electric plate 48 and/or heating of the beverage via the thermal electric plate 48. It should be noted that any predetermined temperature may be used for the cooling or heating of the liquid within the self charging mug 20. Also, if the user interface 28 has the phone charging button pressed the battery management system 40 may allow for the energy storage system 22 to discharge and to provide a charge via a USBc 82 or any other known cable or wireless connection to the external device 84, such as a cell phone thus charging the cell phone via the onboard energy storage system 22 of the self charging mug 20. It should also be noted that the device user interface 28 may allow for the user to know the status of the battery life of the self charging mug 20 thus giving the user time to either charge the battery 22 via either a hot or cold liquid therein or to charge it via USBc cable 82 connected to the sealed connector header 36. It should be noted that the preferred method of charging the self charging mug 20 is via the USBc function 82, wherein a USBc cable 82 is plugged in to the sealed connector header 36 and once the USBc is connected the methodology may determine if the energy storage system 22 is fully charged. If it is not, the LED indicator 86 may light up thus telling the user of the self charging mug 20 that the energy storage system 22 is not fully charged. Once the energy storage system 22 is fully charged, the methodology may enter a new box and disconnect the battery pack 22 from the voltage and current flowing from the USBc cord 82 thus not allowing for the energy storage system 22 to overheat and create problems with overheating batteries. It should be noted that the self charging mug 20 is also capable of charging the energy storage system 22 of the self charging mug 20 via the liquid temperature function of the methodology. It should be noted as stated above, charging via the USBc is the priority of the methodology, however the self charging mug 20 may also be capable of charging its energy storage system batteries 22 whenever a hot or cold liquid is poured into the mug 20. After the liquid is poured into the mug 20 the methodology may test to determine if the energy storage system 22 of the self charging mug 20 is fully charged. If it is not, the energy storage system 22 may turn on a LED indicator 86 stating that the mug 20 is charging. After the energy storage system 22 is fully charged the methodology may enter a box and disconnect the battery pack 22 from the battery management system thermal electric plate 48 thus allowing for no further charging to occur to the battery pack 22 thus reducing the possibility of a mishap with overheating batteries in the self charging mug 20. Generally, the methodology 80 of the self charging mug 20 of the present invention may start by taking either very low voltage from the thermal electric devices 48 and passing the low voltage created through a DC to DC converter thus raising the voltage and charging the battery 22 pack therefrom. Furthermore, if a USBc cable 82 is connected via the seal connector header 36, the AC voltage coming through may be converted to DC and then through a DC to DC converter to charge the battery pack 22 until the battery pack 22 is fully charged. Furthermore, the control board 88 arranged on the battery management system 40 may determine if the user interface 28 is asking for heating or cooling of the beverage or liquid arranged within the self charging mug 20 or the charging of an external device 84 such as a phone the battery management system 40 may take the voltage from the battery pack 22, pass it through a DC to DC converter and allow for charging of the phone via the USBc cable port 82. Hence, the self charging mug 20 of the present invention is capable of being used in any environment and may allow for the charging of an onboard energy storage system 22 via either a hot or cold liquid arranged therein and the charging of external devices via the energy storage system 22 arranged therein.

The present invention has been described in an illustrative manner. It is to be understood that the terminology which has been used is intended to be in the nature of words of description rather than that of limitation.

Any modifications and variations of the present invention are possible in light of the above teachings. Therefore, within the scope of the appended claims, the present invention may be practiced otherwise than what is specifically described.

What is claimed is:

1. A self charging mug, said mug comprising:
   an outer shell;
   an inner shell nested within said outer shell;
   a thermal interface member in contact with said inner shell;
   a thermal electric plate engaged with said thermal interface member;
   a component fixture assembly in contact with a bottom inner surface of said outer shell, said thermal electric plate arranged in a pocket of said component fixture assembly;
   an energy storage system arranged within said component fixture assembly;
   a bidirectional power supply in contact with said component fixture assembly on a side thereof;
   a sealed connector header secured to said bidirectional power supply, said sealed connector header arranged in an orifice through a wall of said outer shell;
   a battery management system in contact with said component fixture assembly on another side thereof, said battery management system is electrically connected to said energy storage system and to said thermal electric plate, said energy storage system is charged via voltage produced by said thermal electric plate using either the heat or cold of a beverage or liquid in said inner shell, said energy storage system controls heating or cooling of said beverage or said liquid via said thermal electric plate; and
   a charge and discharge controller arranged on a surface of said battery management system.

2. The mug of claim 1 further comprising a user interface, said user interface extends through an orifice of said outer shell, said user interface contacts and interacts with said battery management system.

3. The mug of claim 1 further comprising an insulator arranged between a surface of said battery management system and an outer surface of said inner shell.

4. The mug of claim 1 further comprising a seal arranged between an outer surface of said inner shell and an inside surface of said outer shell.

5. The mug of claim 1 further comprising a grip arranged around a predetermined circumference of said outer shell.

6. The mug of claim 1 further comprising a harness arranged between said bidirectional power supply and said battery management system.

7. The mug of claim 1 wherein said inner shell having a generally square or rectangular lower end.

8. The mug of claim 1 wherein said thermal electric plate is electrically connected to said battery management system, said thermal electric plate is a peltier device.

9. The mug of claim 1 wherein said component fixture assembly having a base and a first and second wall extending from said base, said component fixture assembly having a first flange and a second flange extending from each of said walls, said component fixture assembly having an orifice through each said wall, said component fixture assembly having a first and second connector tube extending from each said wall, said component fixture assembly having a fastener arranged in said first and said second connector tube to secure said first wall to said second wall.

10. The mug of claim 1 wherein said component fixture assembly is electrically connected to said battery management system, said component fixture assembly and said battery management system are mechanically attached to said electrical connection.

11. The mug of claim 1 wherein said energy storage system is lithium ion batteries.

12. The mug of claim 1 wherein a second thermal electric plate is arranged in a pocket of a second wall.

13. The mug of claim 1 wherein the mug charges said energy storage system with a USB cable connected to said sealed connector header.

14. The mug of claim 1 wherein said user interface having a plurality of buttons, a first of said buttons is for phone charging, a second of said buttons is for heating a liquid in said mug, a third of said buttons is for cooling said liquid in said mug.

15. A self charging mug, said mug comprising:
   an outer shell;
   an inner shell arranged within said outer shell;
   a bottom housing in contact with said outer shell and said inner shell;
   a first thermal interface in contact with said inner shell;
   a thermal electric plate engaged with said first thermal interface on a first side of said thermal electric plate;
   a second thermal interface in contact with said thermal electric plate on a second side of said thermal electric plate;
   a heat sink member in contact with said second thermal interface, said heat sink member in contact with said bottom housing;
   an energy storage system arranged within said bottom housing, said energy storage system is charged via voltage produced by said thermal electric plate using either the heat or cold of a beverage or liquid in said inner shell, said energy storage system controls heating or cooling of said beverage or said liquid via said thermal electric plate;
   a control board secured to said bottom housing; and
   a communication microcontroller having external wireless communication and control arranged on said control board.

16. The mug of claim 15 further comprising a user interface, said user interface is arranged on and extends from said bottom housing, said user interface contacts and interacts with said control board.

17. The mug of claim 15 further comprising a seal or weld arranged between said outer shell and said bottom housing.

18. The mug of claim 15 wherein the mug charges said energy storage system with a USB cable connected to a sealed connector header.

19. A method of charging or discharging an energy storage system of a mug to charge a phone or heat or cool a liquid therein, said method comprising the steps of:
   pouring a hot or cold liquid in the mug;
   using at least one thermal electric plate to generate voltage via said hot or cold liquid;
   charging the energy storage system with said voltage;
   heating or cooling said liquid with said at least one thermal electric plate if said heating or cooling is chosen by a user of the mug via the energy storage system; and
   charging a phone if chosen by said user with the energy storage system of the mug.

* * * * *